US012714074B2

(12) United States Patent
Sorin et al.

(10) Patent No.: US 12,714,074 B2
(45) Date of Patent: Aug. 25, 2026

(54) BEEHIVE FRAME COVER

(71) Applicant: Beewise Technologies LTD, Kibbutz Beit-Haemek (IL)

(72) Inventors: Yossef Sorin, Klil (IL); Omri Avitan, Dovrat (IL); Yavin Cafri, Kibbutz Reshafim (IL); Elia Goviazin, Kiryat Yam (IL)

(73) Assignee: Beewise Technologies LTD, Kibbutz Beit-Haemek (IL)

( * ) Notice: Subject to any disclaimer, the term of this patent is extended or adjusted under 35 U.S.C. 154(b) by 0 days.

(21) Appl. No.: 18/418,407

(22) Filed: Jan. 22, 2024

(65) Prior Publication Data

US 2024/0156065 A1 May 16, 2024

Related U.S. Application Data

(63) Continuation-in-part of application No. 18/175,712, filed on Feb. 28, 2023.

(60) Provisional application No. 63/545,580, filed on Oct. 25, 2023, provisional application No. 63/381,561, filed on Oct. 30, 2022.

(51) Int. Cl.
*A01K 47/02* (2006.01)
*A01K 47/06* (2006.01)

(52) U.S. Cl.
CPC .............. *A01K 47/02* (2013.01); *A01K 47/06* (2013.01)

(58) Field of Classification Search
CPC ........ A01K 47/02; A01K 47/06; A01K 47/00; A01K 47/04
USPC ........................................................... 449/37
See application file for complete search history.

(56) References Cited

U.S. PATENT DOCUMENTS 453,905 A 6/1891 Holt
1,768,041 A 6/1930 Fenno
2,251,529 A 8/1941 Sterling
2,604,643 A * 7/1952 Hamilton ............... A01K 47/02 449/42

(Continued)

FOREIGN PATENT DOCUMENTS

CN 101720680 6/2010
CN 103583416 2/2014

(Continued)

OTHER PUBLICATIONS

Restriction Official Action Dated Jul. 17, 2024 From the US Patent and Trademark Office Re. U.S. Appl. No. 18/175,712. (6 pages).

(Continued)

*Primary Examiner* — Joshua J Michener
*Assistant Examiner* — Nicole Paige Maccrate

(57) ABSTRACT

A beehive frame cover, method, and apparatus for usage thereof, the beehive frame cover having an elongated body portion extending at least to a length of a top bar of a beehive frame and adapted in size and shape to cover at least a portion of the top bar when placed juxtaposed over and parallelly to the top bar, and two arms disposed at opposite ends of the elongated body portion at a distance adapted to accommodate the top bar, the two arms extruding downwardly from the elongated body portion and adapted to engage and grip the top bar at each of respective opposite ends thereof when placed juxtaposed against and laterally to each of the respective opposite ends of the top bar.

15 Claims, 17 Drawing Sheets

(56) References Cited

U.S. PATENT DOCUMENTS

| | | | |
|---|---|---|---|
| 2,997,326 A | 8/1961 | Daum | |
| 3,290,705 A | 12/1966 | Harrison | |
| 3,456,056 A | 7/1969 | Reich et al. | |
| 3,771,179 A | 11/1973 | Ogilby | |
| 3,789,443 A | 2/1974 | Cowen | |
| 3,914,812 A | 10/1975 | Kent | |
| 3,999,237 A | 12/1976 | Solomon | |
| 4,216,557 A * | 8/1980 | Golde | A01K 47/02 449/43 |
| 4,288,880 A | 9/1981 | Gary et al. | |
| 4,374,440 A * | 2/1983 | Drapkin | A01K 47/02 52/793.1 |
| 4,453,281 A * | 6/1984 | Shanabarger | A01K 47/02 449/37 |
| 4,520,519 A | 6/1985 | Kuehl | |
| 4,573,228 A | 3/1986 | Bachalo | |
| 5,685,762 A | 11/1997 | Penrose et al. | |
| 5,895,310 A * | 4/1999 | Otomo | A01K 47/06 449/20 |
| 6,475,061 B1 | 11/2002 | Huang | |
| 6,524,058 B1 | 2/2003 | Watters | |
| 8,602,837 B1 | 12/2013 | Allan | |
| 10,645,910 B1 | 5/2020 | Gonzales | |
| 10,757,921 B1 | 9/2020 | Wood | |
| 2002/0086430 A1 | 7/2002 | Hopmeier | |
| 2012/0202403 A1 | 8/2012 | Sinanis et al. | |
| 2014/0212520 A1 | 7/2014 | Del Vecchio | |
| 2014/0370781 A1 | 12/2014 | Anderson et al. | |
| 2015/0049919 A1 | 2/2015 | Humal | |
| 2015/0181841 A1* | 7/2015 | Jang | A01K 47/04 449/8 |
| 2016/0015007 A1 | 1/2016 | Sinanis | |
| 2016/0227745 A1* | 8/2016 | Reed | A01K 47/06 |
| 2017/0064931 A1 | 3/2017 | Tagliaferri | |
| 2017/0360010 A1 | 12/2017 | Wilson-Rich | |
| 2018/0035651 A1 | 2/2018 | Anderson | |
| 2018/0160656 A1 | 6/2018 | Ben-Shimon et al. | |
| 2018/0288977 A1 | 10/2018 | Hummer et al. | |
| 2019/0069526 A1* | 3/2019 | Pielemeier | A01K 47/06 |
| 2020/0253168 A1* | 8/2020 | Pearson | A01K 47/02 |
| 2020/0267945 A1 | 8/2020 | Symes et al. | |
| 2020/0315143 A1* | 10/2020 | Radzyner | A01K 51/00 |
| 2020/0349397 A1 | 11/2020 | Criswell et al. | |
| 2021/0161107 A1 | 6/2021 | Gamberoni et al. | |
| 2021/0289765 A1 | 9/2021 | Scofield et al. | |
| 2021/0307301 A1* | 10/2021 | Zmyslony | G01K 3/14 |
| 2022/0022429 A1 | 1/2022 | Hummer et al. | |
| 2022/0201986 A1 | 6/2022 | Jcong | |
| 2024/0138379 A1 | 5/2024 | Radzyner et al. | |

FOREIGN PATENT DOCUMENTS

| | | |
|---|---|---|
| CN | 105519456 | 4/2016 |
| CN | 205511589 | 8/2016 |
| CN | 205511592 | 8/2016 |
| CN | 106719106 | 5/2017 |
| CN | 107047378 | 8/2017 |
| CN | 108668955 | 10/2018 |
| CN | 203087245 | 2/2023 |
| DE | 202006007269 | 7/2006 |
| DE | 102009027378 | 1/2011 |
| DE | 102013006265 | 10/2014 |
| IT | UB20159742 | 6/2017 |
| KR | 10-2012-0045211 | 5/2012 |
| KR | 20-0460083 | 5/2012 |
| KR | 10-2012-0060253 | 6/2012 |
| KR | 10-2012-0102497 | 9/2012 |
| KR | 10-1244803 | 3/2013 |
| KR | 10-2014-0059538 | 5/2014 |
| KR | 20-0475229 | 11/2014 |
| KR | 10-2016-0101621 | 8/2016 |
| KR | 10-2018-0054182 | 5/2018 |
| KR | 10-2093334 | 3/2020 |
| WO | WO 2019/092731 | 5/2019 |
| WO | WO 2021//059282 | 4/2021 |

OTHER PUBLICATIONS

Official Action Dated Oct. 17, 2024 From the US Patent and Trademark Office Re. U.S. Appl. No. 18/175,712. (19 pages).

Official Action Dated Mar. 6, 2025 From the US Patent and Trademark Office Re. U.S. Appl. No. 18/175,712. (17 pages).

Official Action Dated Nov. 26, 2025 from the US Patent and Trademark Office Re. U.S. Appl. No. 18/175,712. (15 pages).

Official Action Dated Jul. 30, 2025 from the US Patent and Trademark Office Re. U.S. Appl. No. 18/175,712. (14 pages).

* cited by examiner

BEEHIVE FRAME COVER

RELATED APPLICATIONS

This application is a Continuation-in-Part (CIP) of U.S. patent application Ser. No. 18/175,712 filed on Feb. 28, 2023, which claims the benefit of priority of U.S. Provisional Patent Application No. 63/381,561 filed on Oct. 30, 2022.

This application also claims the benefit of priority of U.S. Provisional Patent Application No. 63/545,580 filed on Oct. 25, 2023.

The contents of the above applications are all incorporated by reference as if fully set forth herein in their entirety.

FIELD AND BACKGROUND OF THE INVENTION

Some embodiments described in the present disclosure relate to beekeeping and, more specifically, but not exclusively, to a beehive frame cover and use thereof, optionally in adapting respective units of commercially available beehive frames to and/or facilitating usage thereof in an autonomous, automated, and/or semi-automated beehive control and management.

Beekeeping, also referred to as apiculture, is the maintenance of bee colonies in hives, for various applications and purposes including, for example, the production and collection of hive contents and produce such as honey, beeswax, propolis, pollen, royal jelly, and/or the like; the pollination of crops; production of bees for breeding and/or sale to others; and/or the like.

Artificial and/or modern beehives (e.g., from mid-to-late nineteenth century era) where domesticated bee colonies are accommodated typically comprise a rectangular-shaped casing or box body in which there are movably mounted several parallel frames that house plates of wax-made honeycomb and/or brood combs containing eggs, larvae, pupae, and/or food storages of honey, pollen, nectar, royal jelly and/or the like.

Movable comb frames of such sort thus allow for removal and/or manipulation of individual respective honey and/or brood combs, e.g., for honey harvesting and/or likewise produce extraction, as well as periodic inspection, treatment, and/or other likewise maintenance and/or management operations, without destruction of the beehive and/or infliction of permanent damage to the comb and/or the hive otherwise.

It has long been recognized that bees have a vital and crucial role in the preservation of nature's ecological balance and biological diversity, in general, and the viable agricultural production of crops and/or other grown produce, in particular.

SUMMARY OF THE INVENTION

It is an object of the present disclosure to describe a beehive frame cover and use thereof, optionally employed within autonomously, automatically, and/or semi-automatically controlled and/or managed beehives.

The foregoing and other objects are achieved by the features of the independent claims. Further implementation forms are apparent from the dependent claims, the description and the figures.

According to an aspect of some embodiments of the disclosed subject matter there is provided a beehive frame cover, comprising: an elongated body portion extending at least to a length of a top bar of a beehive frame and adapted in size and shape to cover at least a portion of the top bar when placed juxtaposed over and parallelly to the top bar; and two arms disposed at opposite ends of the elongated body portion at a distance adapted to accommodate the top bar, the two arms extruding downwardly from the elongated body portion and adapted to engage and grip the top bar at each of respective opposite ends thereof when placed juxtaposed against and laterally to each of the respective opposite ends of the top bar.

Optionally, an arm of the two arms comprises two outer surface portions disposed laterally at each of opposite sides of a transverse axis of the top bar and adapted to be engaged and gripped by jaws of downward facing clamps, whereby allowing for retaining the beehive frame and spatially translating thereof via motion of the downward facing clamps.

Optionally, an arm of the two arms comprises, on an exterior region thereof facing outwardly of the top bar, a protruding portion having at each of opposing sides of the arm a slanted surface boundary facing laterally from the beehive frame and adapted to engage with a slanted surface boundary at a back of each of downward facing clamps, thereby allowing the downward facing clamps to exert mechanical force on the arm at the protruding portion for displacing the beehive frame sideways.

Optionally, the elongated body portion comprises a concave shaped portion extending along at least part of an axial edge thereof, and a corresponding convex shaped portion extending along at least part of an opposite axial edge thereof, whereby consecutive units of the beehive frame cover are adapted to engage one another at respective concave and convex shaped portion to form a contiguous cover.

More optionally, the convex shaped portion comprises at least one elastic flange.

More optionally, the convex shaped portion comprises a pair of elastic flanges inclined towards one another.

Optionally, an arm of the two arms extends to a length of at least a portion of a height of the beehive frame and adapted to engage with at least portion of a respective side bar of the beehive frame proximally to the top bar.

Optionally, an arm of the two arms comprises, in an interior region thereof facing the top bar, a recessed portion adapted to accommodate a respective ear of the top bar protruding over a respective side bar of the beehive frame.

Optionally, an arm of the two arms comprises a groove adapted to engage a rail provided within a beehive housing, whereby a beehive frame attached to the beehive frame cover is allowed to slide along the rail transversely.

Optionally, an arm of the two arms comprises at respective opposing sides laterally to the top bar a cavity on one of the respective opposing sides and a protrusion adapted to be fitted into the cavity at least partially on another one of the respective opposing sides, whereby consecutive units of the beehive frame cover stacked side-by-side against one another are kept aligned at a minimum distance therebetween.

Optionally, an arm of the two arms and the elongated body portion are attached by a hinge disposed transversely at an end of the elongated body portion, whereby the arm is at least partially rotatable around a transverse axis of the top bar to alternate between an open and closed position, wherein in the closed position the arm is engaged with and firmly gripping the top bar for securely retaining the beehive frame, and wherein in the open position the arm is hanging loosely and freely on the hinge and not engaging the top bar.

More optionally, the arm comprises a latch adapted to engage with a groove provided at the end of the elongated body portion for securely fastening the arm to the top bar when the arm is in the closed position, wherein the latch is adapted to allow releasing grip of the arm on the top bar in response to pressing the latch towards the elongated body portion and outwards of the groove.

Optionally, the elongated body portion and two arms are integrally formed into a single monolithic unit, wherein the two arms are rigidly disposed perpendicularly to the elongated body portion.

Optionally, the elongated body portion comprises at least one bore adapted to allow access to the top bar for probing the beehive frame.

Optionally, the beehive frame cover further comprises an alignment pattern adapted to enable recovery of alignment information when the alignment pattern is at least partially visible.

Optionally, the beehive frame cover further comprises a radio frequency identification tag.

According to another aspect of some embodiments of the disclosed subject matter there is provided a method for automated beehive control using the beehive frame cover of claim 1, the method comprising: inserting at least one pair of downwards facing clamps into two consecutive spaces between adjacent beehive frames disposed in a beehive habitat; decreasing a distance between jaws of each of the at least one pair of downwards facing clamps until the jaws engage and retain the beehive frame cover; and spatially translating the beehive frame cover and a respective beehive frame to which the beehive frame cover is attached via motion of the at least one pair of downwards facing clamps.

Optionally, the method further comprises exerting mechanical force by one or more of the at least one pair of downwards facing clamps on at least one other beehive frame cover and at least one respective other beehive frame to which the beehive frame cover is attached to displace the at least one respective other beehive frame sideways and increase a distance between the respective beehive frame and at least one respective other beehive frame.

Optionally, the method further comprises shaking the respective beehive frame in response to the jaws engaging and retaining the beehive frame cover to force bees thereon disengaging therefrom.

According to yet another aspect of some embodiments of the disclosed subject matter there is provided an apparatus for automated beehive control using the beehive frame cover of claim 1, the apparatus comprising: a processing circuitry adapted to execute code for: communicating a robotic arm comprising at least one pair of downwards facing clamps for: inserting the at least one pair of downwards facing clamps into two consecutive spaces between adjacent beehive frames disposed in a beehive habitat; decreasing a distance between jaws of each of the at least one pair of downwards facing clamps until the jaws engage and retain the beehive frame cover; and spatially translating the beehive frame cover and a respective beehive frame to which the beehive frame cover is attached via motion of the at least one pair of downwards facing clamps.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which embodiments. Although methods and materials similar or equivalent to those described herein can be used in the practice or testing of embodiments, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the disclosed subject matter can involve performing or completing selected tasks manually, automatically, or a combination thereof. Moreover, according to actual instrumentation and equipment of embodiments of the method and/or system of the disclosed subject matter, several selected tasks could be implemented by hardware, by software or by firmware or by a combination thereof using an operating system.

For example, hardware for performing selected tasks according to embodiments of the disclosed subject matter could be implemented as a chip or a circuit. As software, selected tasks according to embodiments of the disclosed subject matter could be implemented as a plurality of software instructions being executed by a computer using any suitable operating system. In an exemplary embodiment of the disclosed subject matter, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWING(S)

Some embodiments are herein described, by way of example only, with reference to the accompanying drawings. With specific reference now to the drawings in detail, it is stressed that the particulars shown are by way of example and for purposes of illustrative discussion of embodiments. In this regard, the description taken with the drawings makes apparent to those skilled in the art how embodiments may be practiced.

Figure 7:
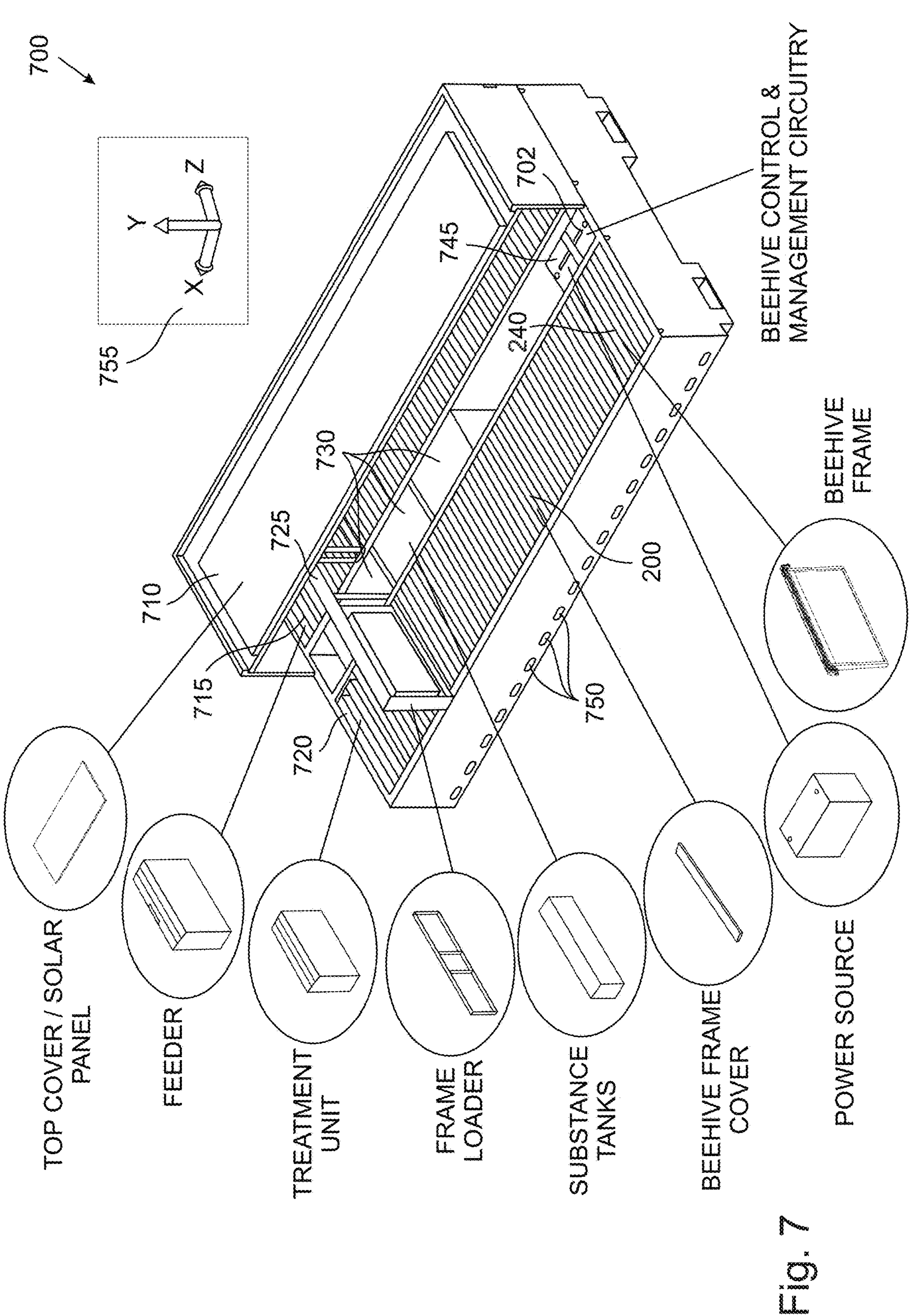
Figure 8:
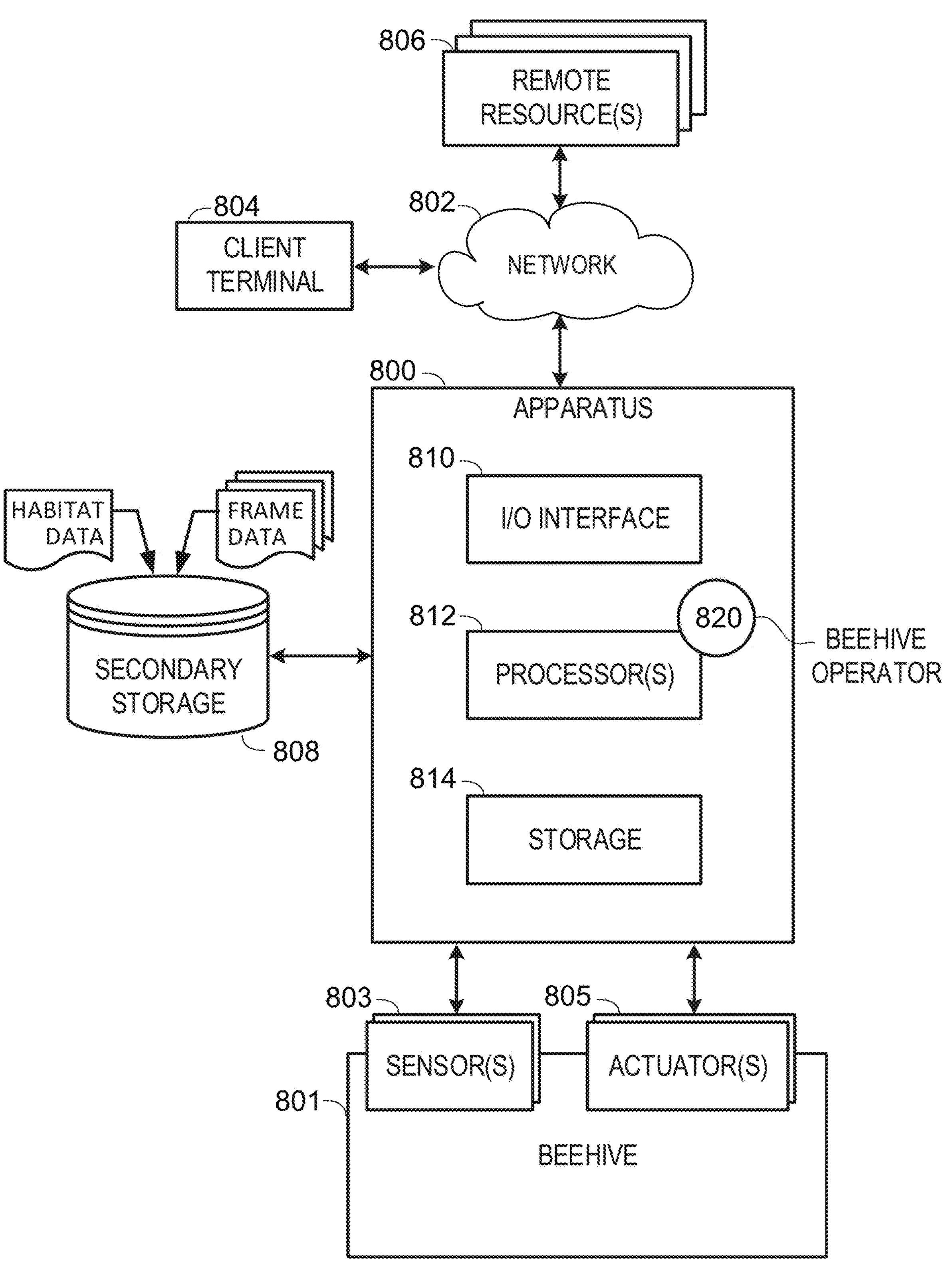

FIG. 7 is a schematic illustration of an exemplary automated beehive in which instances of a beehive frame cover are adapted to be deployed and utilized, according to some embodiments; and FIG. 8 is a schematic block diagram of an exemplary apparatus for control and management of an automated beehive in which instances of a beehive frame cover are adapted to be deployed and utilized, according to some embodiments.

DESCRIPTION OF SPECIFIC EMBODIMENTS OF THE INVENTION

Some embodiments described in the present disclosure relate to beekeeping and, more specifically, but not exclusively, to a beehive frame cover and use thereof, optionally in the context of autonomous, automated, and/or semi-automated beehive control and/or management operation(s).

There are a variety of reasons why bees are dying in droves all around the world. Chief among them are climate changes, pesticides, diseases, pests, and more. Without help, the honeybee species is at risk of going extinct. Since bees are strategic and critical to the global food supply of both humans and animals, protection of bees and/or bee colonies is considered a global challenge and a priority for private institutions, public institutions, governments, and non-governmental organizations alike.

Globally, the lion's share of honeybees is grown and treated in beehives, by beekeepers, and scattered in the fields for foraging purposes. They are then "rented" out to farmers for pollination purposes. Because beekeepers even nowadays typically keep bees in traditional 150-year-old white wooden boxes (e.g., Langstroth beehives), they must physically visit their hives for inspection and treatment. The frequency at which such visits occur is usually once every three or four weeks, at best, per given hive. Unfortunately, by the time beekeepers visit their hives, they often find that some have already collapsed (due to the stressors such as mentioned herein).

Moreover, inspection and/or treatment of honeycombs when using traditional beehives involves opening the beehive, e.g., exposing and/or widening an aperture in a housing thereof and/or the like, and further extracting frames from the beehive, thus potentially exposing and/or subjecting bees to undesirable conditions.

Additionally, as beehive frames are disposed serially along one another in a beehive box of such traditional configuration and/or structure as discussed and illustrated herein, in order to extract one frame at a time for inspection and/or treatment, a top portion cover of the beehive box in question has to be removed, and thus an entirety of the beehive frames therein need to be uncovered to allow access to each respective frame at hand, possibly causing an adverse effect on bees residing on other frames in the box, e.g., agitation and/or the like, due to unnecessary exposure to sub-optimal and/or undesirable conditions such as, for example, direct sunlight and/or the like.

One technical challenge dealt with by the disclosed subject matter is to provide for tools and/or techniques via which bees in a beehive may be inspected, treated, and/or otherwise handled and/or cared for, at minimized risk of injuries and/or exposure to undesirable conditions inflicted upon either the bees, humans, and/or property.

Another technical challenge dealt with by the disclosed subject matter is to provide for tools and/or techniques to facilitate beekeeping operations at an automated and/or autonomous manner, e.g., bees' inspection, treatment, and/or likewise actions on a beehive and/or bee colony accommodated therein, so that such tasks are thereby enabled to be carried out automatically, autonomously, continuously, periodically, reactively, efficiently, cost-effectively, and/or the like.

Yet another technical challenge dealt with by the disclosed subject matter is to provide for tools and/or techniques to allow beekeepers using legacy beekeeping equipment such as traditional beehive frames of Langstroth beehives and/or the like to easily and conveniently transform and/or adapt such beehive frames to be compatible with and/or suitable for accommodation within an automated and/or autonomous beehive habitat, as discussed and illustrated herein.

One exemplary illustrative automatic beehive assembly with a hive chamber for housing a plurality of releasable frames, and including one or more mechanical arrangements (e.g., actuators and/or the like) for removing and/or inserting frames from and/or into the hive chamber, harvesting honey from hive frames, delivering nutritional substances and/or the like into the beehive for feeding bees, operating climate control equipment (e.g., fans, ventilation devices, air conditioners, and/or the like), applying to hive frames pesticides, heat, radiation, and/or the like for pest treatment, and/or any likewise beekeeping operations, is described for example in patent application publication no. WO 2019/092731 A1, entitled "AUTOMATIC BEEHIVES", which is hereby incorporated by reference in its entirety without giving rise to disavowment.

It would be appreciated by a skilled artisan, however, that such automatic beehive assembly may require beekeepers and/or apiarists starting from scratch a process of populating and cultivating bees and/or bee colonies therein, as pre-existing beehives and individual components thereof, such as pre-existing beehive frames commercially available, may not necessarily be compatible with a habitat and/or internal composition of an automatic beehive, such as components, structures, materials, actions, tools, and/or techniques utilized therein for manipulation, inspection, and/or treatment of beehive frames and/or the like, and thus pre-existing, commercially available beehive frames may not be readily available for incorporation and utilization within automatic beehives of this sort. Such incompatibility may pose a significant barrier on beekeepers from adopting automatized and/or autonomous beekeeping tools and/or techniques, as may be otherwise afforded by the automatic beehive assembly and/or similar technologies relying on customized and/or tailor made structures and/or designs of beehive frames and/or other beehive components.

One exemplary illustrative common design for legacy artificial beehives commercially available (e.g., Langstroth-type and/or the like) is top opening boxes with about eight to ten hive frames hung vertically from edges of the box. Typically, the frames are spaced at about 38 mm (center to center) from one another. The box most often has a removable cover that conceals the hive frames from view. Each hive frame is a (typically wooden) structure that houses/includes a honeycomb, brood comb, and/or likewise contents of a beehive frame.

One exemplary illustrative common beehive frame structure and composition includes a top bar, two side bars connected to and descending vertically from the top bar, and a bottom bar connecting the side bars and completing the frame. Such hive frames are typically constructed of wood, but may also be constructed of plastic and/or other materials.

One exemplary illustrative common hive configuration such as commonly used in the United States, for example, employs top bars with a length of about 48 cm. In some exemplary illustrative common configurations, deep hives have side bars each of which with a length of about 23 cm, medium hives have side bars with a length of about 16 cm each, and shallow hives have side bars with a length of about 14 cm each.

According to further exemplary illustrative common beehive frame structure and composition, each top bar has an ear at each end. According to further exemplary illustrative common hive configurations, the ears sit on a top edge of the hive box. A hive box typically contains 8 to 10 hive frames, although other configurations are possible.

Figure 1:
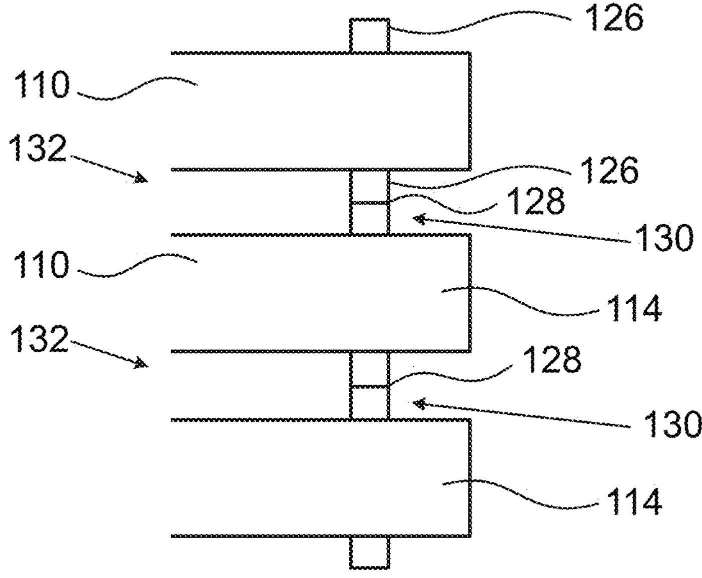
FIG. 1 is a schematic illustration of a partial top view of exemplary beehive frames, such as employed in conventional beehive boxes, and which respective instances of a beehive frame cover are adapted to be mounted onto each thereof, according to some embodiments.

Reference is now made to FIG. 1 which is a schematic illustration of a partial top view of exemplary beehive frames, such as employed in conventional beehive boxes, and which respective instances of a beehive frame cover are adapted to be mounted onto each thereof, according to some embodiments.

FIG. 1 shows one end and a body portion of each of three top bars 110 with respective pairs of ears 114 protruding beyond posts 126 of respective side bars of each of top bars 110. The respective posts 126 of each pair of adjacent frames are typically sealed together by the bees with glue joints 128 made of wax. Posts 126 separate a space 132 between adjacent frames from a space 130 between adjacent ears.

In some embodiments, there is provided a beehive frame cover, having an elongated body portion extending at least to a length of a top bar of a beehive frame and adapted in size and shape to cover at least a portion of the top bar when placed juxtaposed over and parallelly to the top bar, and two arms disposed at opposite ends of the elongated body portion at a distance adapted to accommodate the top bar, the two arms extruding downwardly from the elongated body portion and adapted to engage and grip the top bar at each of respective opposite ends thereof when placed juxtaposed against and laterally to each of the respective opposite ends of the top bar.

Optionally, one or more of the two arms may have two outer surface portions disposed laterally at each of opposite sides of a transverse axis of the top bar, and adapted each to be engaged and gripped by respective jaws of at least one downward facing clamp, thereby allowing the at least one downward facing clamp to retain and spatially translate the beehive frame, via motion of the downward facing clamp(s) and/or jaws thereof.

Optionally, one or more of the two arms may have, on an exterior region thereof facing outwardly of the top bar, a protruding portion having, at each of opposing sides of the arm, a slanted surface boundary, facing laterally from a longitudinal axis of the beehive frame, and adapted to engage with a corresponding slanted surface boundary provided at a back of each jaw of a downward facing clamp, thereby allowing the downward facing clamp, when engaging with the back of each jaw with laterally opposing slanted surface boundaries of protruding portions of respective beehive frame covers mounted onto adjacent beehive frames, to exert mechanical force on respective one or more of the two arms at the protruding portion, for displacing each of the adjacent beehive frames sideways, i.e., in at least one direction parallelly to a transverse axis of the top bar.

Optionally, the elongated body portion may comprise a concave shaped portion extending along at least part of an axial edge thereof, and a corresponding convex shaped portion extending along at least part of an opposite axial edge thereof, thereby consecutive units of the beehive frame cover may be adapted to engage with one another at respective concave and convex shaped portion of each unit to form a contiguous cover over beehive frames onto which they are mounted.

More optionally, the convex shaped portion may comprise at least one elastic flange. In some further exemplary embodiments, the convex shaped portion may comprise a pair of elastic flanges inclined towards one another, along at least two axial edges of the beehive frame cover.

Optionally, either one and/or both of the two arms may extend to a length of at least a portion of a height of the beehive frame, and may be adapted to engage with at least portion of a respective side bar of the beehive frame proximally to the top bar.

Optionally, either one and/or both of the two arms may comprise, in an interior region thereof facing the top bar, a recessed portion adapted to accommodate a respective ear of the top bar protruding over a respective side bar of the beehive frame.

Optionally, either one and/or both of the two arms may comprise a groove adapted to engage a rail provided within a beehive housing, whereby a beehive frame attached to the beehive frame cover is allowed to slide along the rail transversely.

Optionally, either one and/or both of the two arms may comprise, at respective opposing sides laterally to the top bar, a cavity on one of the respective opposing sides, and a protrusion, adapted to be fitted into the cavity at least partially, on another one of the respective opposing sides, thereby consecutive units of the beehive frame cover may be stacked side-by-side against one another while kept aligned at a minimum distance therebetween.

Optionally, either one and/or both of the two arms and the elongated body portion may be attached by a hinge disposed transversely at an end of the elongated body portion, thereby the arm is at least partially rotatable around a transverse axis of the top bar, so as to alternate between an open and closed position, wherein in the closed position, the arm may be engaged with and firmly grip the top bar for securely retaining the beehive frame, and wherein in the open position, the arm may be hanging loosely and freely on the hinge and not engage with the top bar.

More optionally, the arm attached to the elongated body, e.g., by hinge and/or the like, may comprise a latch adapted to engage with a groove provided at the end of the elongated body portion for securely fastening the arm to the top bar when the arm is in the closed position, and the latch may be adapted to allow releasing grip of the arm on the top bar in response to pressing the latch towards the elongated body portion and outwards of the groove.

Optionally, the elongated body portion and two arms may be integrally formed into a single monolithic unit, wherein the two arms may be rigidly disposed perpendicularly to the elongated body portion. The arms may be adapted to snap to fit onto a top bar of a beehive frame for securely fastening the beehive frame cover thereto.

Optionally, the elongated body portion comprising at least one bore, hole, cavity, and/or the like adapted to allow access to the top bar for probing the beehive frame. The holes and/or cavities may be utilized, for example, to insert sensors and/or treatment components into and/or in touch with the beehive frame and/or top bar thereof.

Optionally, the beehive frame cover may comprise an alignment pattern adapted to enable recovery of alignment information when the alignment pattern is at least partially visible. The alignment pattern may enable accurately positioning a downward facing clamp above the beehive frame cover for manipulation and/or interaction therewith and/or a beehive frame onto which the beehive frame cover may be mounted.

Additionally or alternatively, the alignment pattern may comprise and/or be adapted to serve as an identification element of the beehive frame. Otherwise, an identification element such as a radio frequency identification (RFID) component and/or the like may be also provided on the beehive frame cover.

In some embodiments, the beehive frame cover may be used for automated beehive control, which may include inserting at least one pair of downwards facing clamps into two consecutive spaces between adjacent beehive frames disposed in a beehive habitat, decreasing a distance between jaws of each of the at least one pair of downwards facing clamps until the jaws engage and retain the beehive frame cover, and spatially translating the beehive frame cover and a respective beehive frame to which the beehive frame cover is attached via motion of the at least one pair of downwards facing clamps.

Optionally, the automated beehive control may further include exerting mechanical force by one or more of the at least one pair of downwards facing clamps on at least one other beehive frame cover and at least one respective other beehive frame to which the beehive frame cover is attached to displace the at least one respective other beehive frame sideways and increase a distance between the respective beehive frame and at least one respective other beehive frame.

Optionally, the automated beehive control may further include shaking the respective beehive frame in response to the jaws engaging and retaining the beehive frame cover to force bees thereon disengaging therefrom.

In some embodiments, an automated beehive control apparatus using the beehive frame cover may include a processing circuitry adapted to execute code for communicating a robotic arm comprising at least one pair of downwards facing clamps, for inserting the at least one pair of downwards facing clamps into two consecutive spaces between adjacent beehive frames disposed in a beehive habitat, decreasing a distance between jaws of each of the at least one pair of downwards facing clamps until the jaws engage and retain the beehive frame cover, and spatially translating the beehive frame cover and a respective beehive frame to which the beehive frame cover is attached via motion of the at least one pair of downwards facing clamps.

Optionally, the processing circuitry may be further adapted to execute code for communicating the robotic arm for exerting mechanical force by one or more of the at least one pair of downwards facing clamps on at least one other beehive frame cover and at least one respective other beehive frame to which the beehive frame cover is attached to displace the at least one respective other beehive frame sideways and increase a distance between the respective beehive frame and at least one respective other beehive frame.

Optionally, the processing circuitry may be further adapted to execute code for communicating the robotic arm for shaking the respective beehive frame in response to the jaws engaging and retaining the beehive frame cover to force bees thereon disengaging therefrom.

One technical effect of utilizing the disclosed subject matter is to provide for a configuration by which a cover of a top opening beehive is divided into sections, so that each section has a width corresponding to a hive frame positioned below and parallel to the cover section, thereby each of a plurality of beehive frames in a beehive box, habitat, and/or the like, is individually covered by a respective instance of a beehive frame cover, adapted to be mounted thereon and to selectively and releasably retain thereof, and to further be manipulated, displaced, removed, re-inserted, substituted, and/or the like, independently and separately from other beehive frame cover instances and/or respective beehive frames onto which they are mounted.

It would be readily appreciated by those skilled in the art that such configuration wherein each beehive frame is individually covered by a beehive frame cover such as disclosed herein, brings about and/or contributes to minimization of and/or reduction in disturbance to bees during beekeeping operations such as caused by removing a conventional beehive box top cover (which covers all of the fames in a hive). As those skilled in the art would readily further appreciate, a magnitude of the reduction in disturbance to bees increases as the number of beehive frames in the beehive increases.

Another technical effect of utilizing the disclosed subject matter is to for a configuration which contributes to ease of handling and/or storing a beehive top cover when a beehive frame is being handled. It would be readily appreciated by those skilled in the art that such configuration allows for utilizing a plurality of instances of a beehive frame cover as disclosed herein to cover the plurality of beehive frames in addition to or in replacement of a pre-existing top cover of the beehive.

Yet another technical effect of utilizing the disclosed subject matter is to provide for a beehive frame cover that is attached to a beehive frame such that the beehive frame cover and respective beehive frame onto which the beehive frame cover is mounted can be handled as a single unit. Optionally, in some embodiments, such attachment obviates a need to store a cover (whether of individual frames and/or of entire habitat) when extracting from and/or returning to a beehive a beehive frame for inspection and/or treatment. As those skilled in the art would readily appreciate, a magnitude of the contribution to ease of handling and/or storing the cover, according to some exemplary embodiments of the disclosed subject matter, increases as the number of beehive frames in the beehive increases.

Before explaining at least one embodiment in detail, it is to be understood that embodiments are not necessarily limited in its application to the details of construction and the arrangement of the components and/or methods set forth in the following description and/or illustrated in the drawings and/or the Examples. Implementations described herein are capable of other embodiments or of being practiced or carried out in various ways.

Figure 2A:
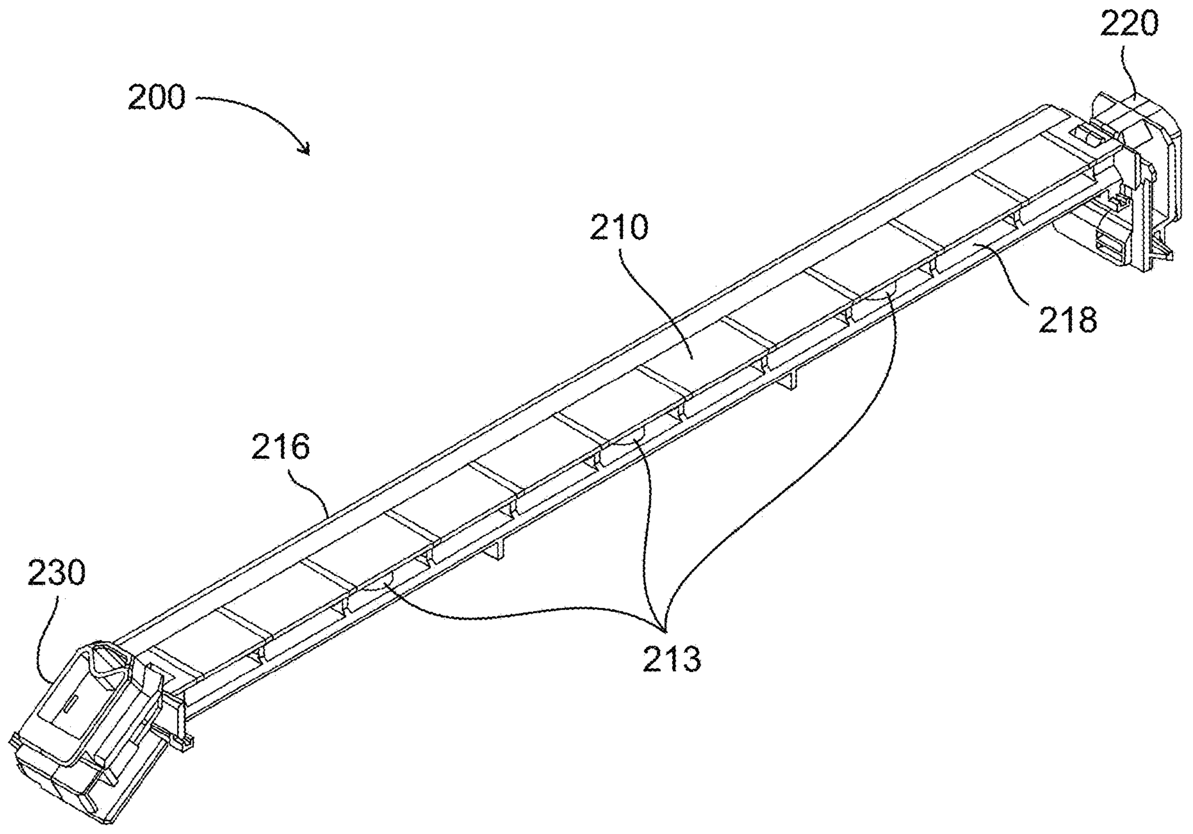
FIG. 2A is a top front side perspective view of an exemplary beehive frame cover having rotatable arms, according to some embodiments.

Reference is now made to FIG. 2A which is a top front side perspective view of an exemplary beehive frame cover having rotatable arms, according to some embodiments.

Figure 2B:
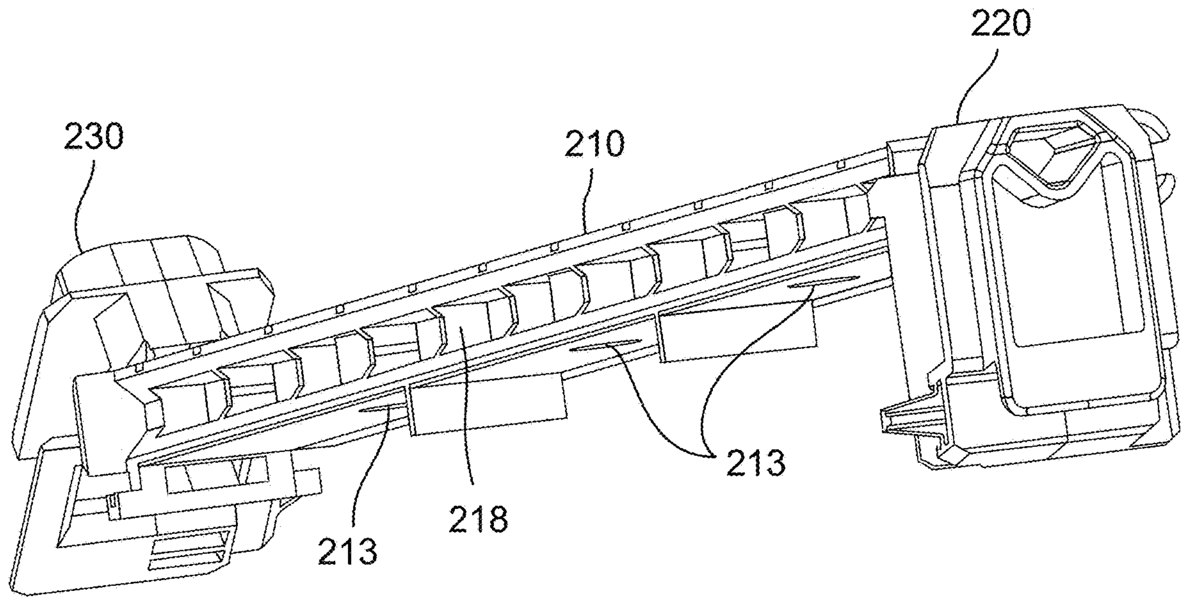
FIG. 2B is a bottom right side perspective view of an exemplary beehive frame cover having rotatable arms, according to some embodiments.

Reference is also made to FIG. 2B which is a bottom right side perspective view of an exemplary beehive frame cover having rotatable arms, according to some embodiments.

Figure 2C:
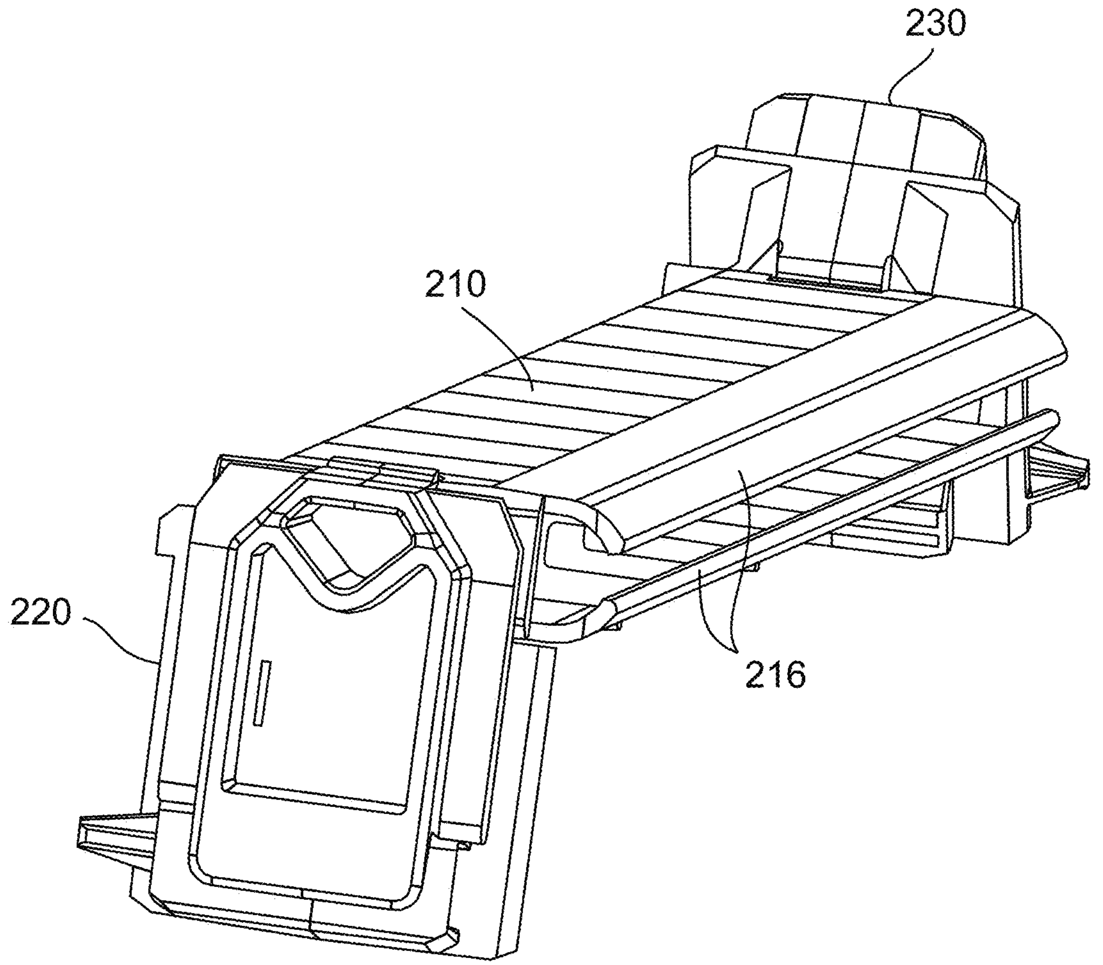
FIG. 2C is a top left side perspective view of an exemplary beehive frame cover having rotatable arms, according to some embodiments.

Reference is also made to FIG. 2C which is a top left side perspective view of an exemplary beehive frame cover having rotatable arms, according to some embodiments.

As shown on FIGS. 2A, 2B, and 2C, an exemplary beehive frame cover such as 200 may comprise an elongated body 210, adapted at least in one of dimensions, shape, contour, orientation, spatial arrangement, and/or the like, to cover at least partially a top bar of a beehive frame, such as may be commercially available and/or similarly as each of the exemplary beehive frames as schematically illustrated on FIG. 1 herein.

The beehive frame cover 200 may comprise and/or be provided with two rotatable arms such as 220 and/or 230, disposed at each of opposite ends of the elongated body 210 and along a longitudinal axis thereof. The rotatable arms 220 and/or 230 may be collectively referred to hereinafter as rotatable arms 220 and/or 230, and/or individually as rotatable arm 220 and/or 230, merely for simplicity purposes. The rotatable arms 220 and/or 230 may be similar and/or even identical, and accordingly, the terms “rotatable arm 220” and/or “rotatable arm 230” as referred to herein may relate to a same element and may be used herein interchangeably.

In some exemplary embodiments, the two rotatable arms 220 and 230 of the beehive frame cover 200 may be adapted to be selectively put into and/or out of a position in which either one and/or both the rotatable arms 220 and 230 may extend downwardly from the elongated body 210, optionally in a substantially right angle therewith and/or the like, for engaging with and/or retaining respective opposite ends of a top bar of a beehive frame, such as described and illustrated at further detail herein.

In some exemplary embodiments, the beehive frame cover 200 may comprise a convex shaped portion and/or curved edge, extending along at least a portion of a length of one axial edge of the elongated body 210, such as convex ridge 216, and a concave shaped portion and/or cavity, extending along at least a portion of a length of an opposite axial edge of the elongated body 210, such as concave groove 218. The convex ridge 216 and concave groove 218 may be corresponding to one another and adapted in size and/or shape thereof for engaging together by receiving, into a respective concave groove 218 of one instance of the beehive frame cover 200, a respective convex ridge 216 of another instance of the beehive frame cover 200, such that the convex ridge 216 may be seated in the concave groove 218.

Similarly, by insertion into each concave groove 218 of a respective subsequent unit of beehive frame cover 200 a respective convex ridge 216 of a respective preceding unit of beehive frame cover 200, a plurality of consecutive units (i.e., respective instances) of the beehive frame cover 200 may form a cover of an entirety of beehive frames onto which the plurality of beehive frame covers 200 are mounted, which cover thus formed may be substantially and/or essentially contiguous for virtually all and/or most practical intents and purposes, as described and illustrated herein.

In some exemplary embodiments, the beehive frame cover 200 and/or convex ridge 216 thereof may comprise at least one elastic flange along at least one axial edge of beehive frame cover 200. Optionally, the beehive frame cover 200 and/or convex ridge 216 may comprise a pair of elastic flanges inclined towards one another along respective axial edges of beehive frame cover 200, such as shown for example on FIG. 2C herein. Optionally, the beehive frame cover 200, convex ridge 216, and/or concave groove 218 thereof, may comprise elastic material and serve as the flanges. The elastic flanges and/or material composition of the convex ridge 216 and/or concave groove 218 may be and/or comprise, for example, rubber, silicon, and/or any likewise materials and/or combinations thereof. Optionally the at least one elastic flange may be adapted to contribute to formation of a seal between adjacent individual instances and/or units of beehive frame cover 200 assembled into a contiguous cover, as described and illustrated herein.

In some exemplary embodiments, when first and second instances of beehive frame cover 200 are placed adjacent and in juxtaposition to one another in a beehive, the respective convex ridge 216 and concave groove 218 thereof engaging with one another thus prevent passage of bees between the adjacent and juxtaposed instances of beehive frame cover 200. A series of adjacent instances of beehive frame cover 200 may form a contiguous cover of the beehive (i.e., the top side of the hive).

In some exemplary embodiments, the elongated body 210 may be at least partially hollow and/or comprise therein one or more inner spaces, lumens, cavities, and/or the like, optionally provided with access thereto via at least one aperture at the elongated body 210. For example, the elongated body 210 may be composed of two (top and bottom) flat panels, which may be spaced apart from, and/or at least partially connected to one another via a plurality of transverse ribs, such as shown on FIGS. 2A, 2B, and 2C herein, thereby one or more vacant volumes may be formed which boundaries thereof defined by the ribs and the upper and lower panels. Such internally hollow portion(s) of the elongated body 210 may optionally be adapted to receive and/or accommodate equipment, components, structures, materials, and/or the like to enable, facilitate, and/or support performance of beekeeping operations, such as for example, monitoring, treating, and/or otherwise handling a beehive frame onto which the beehive frame cover 200 is mounted.

Such equipment, components, structures, materials, and/or the like, collectively referred to herein as "infrastructure", may include, for example: circuitry components such as wires, sockets, jacks and/or the like; sensors such as for example, thermal sensors, chemical sensors, volume sensors, fluid sensors, photoelectric sensors, acoustic sensors, imaging sensors (e.g., cameras), and/or the like; wired and/or wireless receivers, transmitters, transceivers, and/or the like; radio frequency identification (RFID) tags, near field communication (NFC) chips, and/or any likewise similar short range communication components; etc.

Additionally or alternatively, the infrastructure (not shown) placed within the elongated body 210 may be utilized to allow and/or provide for powering of, communicating with, operating, controlling, and/or otherwise using mechanical, electronic, and/or likewise equipment such as, for example, one or more of wired and/or wireless receivers/transmitters, sensors, embedded treatment units, and/or any other likewise components installed in and/or on beehive frame(s) and/or elsewhere in a habitat in which beehive frame(s) may be accommodated. For example, the infrastructure (not shown) may enable wireless communication with beehive frame(s), operating heater(s) and/or substance discharge component(s), as well as powering, and/or receiving data from sensors, e.g., chemical, audio, heat, and/or other likewise sensors.

It will be noted that by facilitating operation of communication components, treatment components, sensors, and/or the like such as described herein, a beehive frame cover such as 200 and usage thereof, such as disclosed herein, allows for monitoring as well as performing reactive and/or periodic beekeeping operations with regard to various aspects of a colony of bees, without opening a beehive (habitat) and/or removing a top cover thereof in entirety, thus greatly reducing negative effects on bees caused by traditional and/or pre-existing tools and/or techniques.

In some exemplary embodiments, one or more cavities, holes, bores and/or the like such as 213 may be provided within the elongated body 210 at least on one edge surface and/or facet thereof, so as to allow access to at least a portion and/or boundary of a top bar of a beehive frame onto which the beehive frame cover 200 may be mounted, whereby the beehive frame may be probed and/or otherwise contacted, e.g. for wiring purposes and/or the like.

Figure 2D:
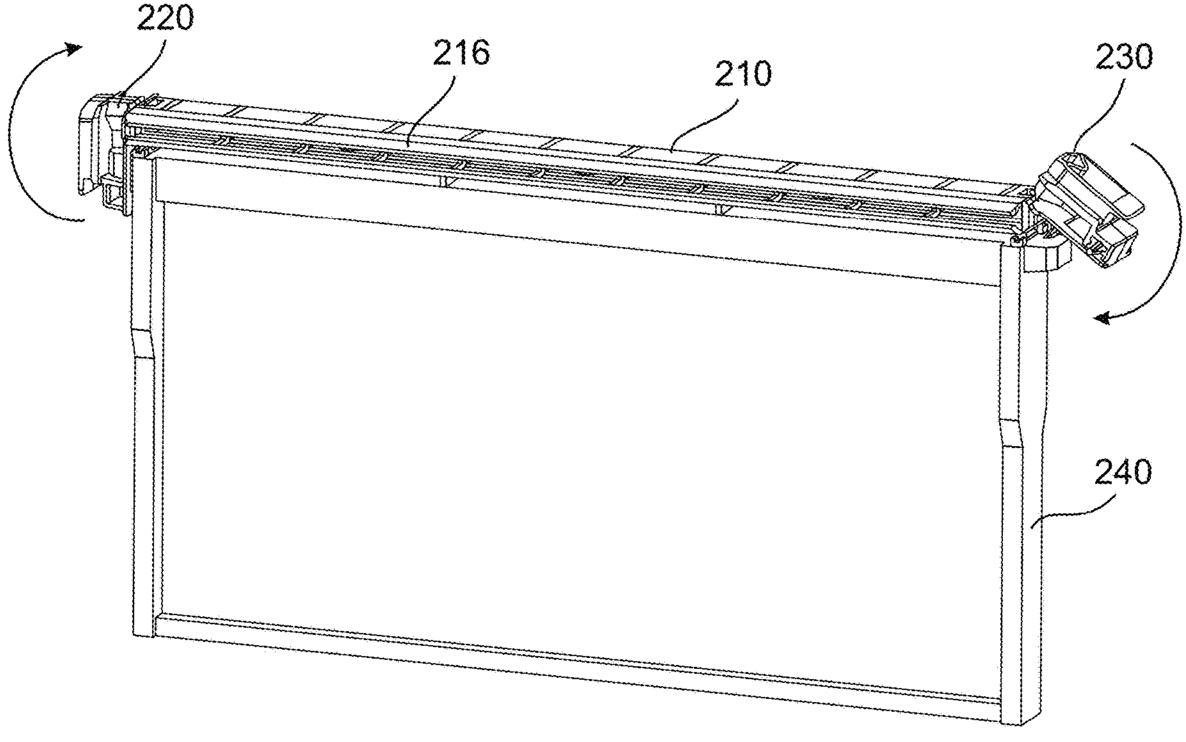
FIG. 2D is a top rear side perspective view of an exemplary beehive frame cover having rotatable arms and being mounted onto a beehive frame, according to some embodiments.

Reference is now made to FIG. 2D which is a top rear side perspective view of an exemplary beehive frame cover having rotatable arms and being mounted onto a beehive frame, according to some embodiments.

Figure 2E:
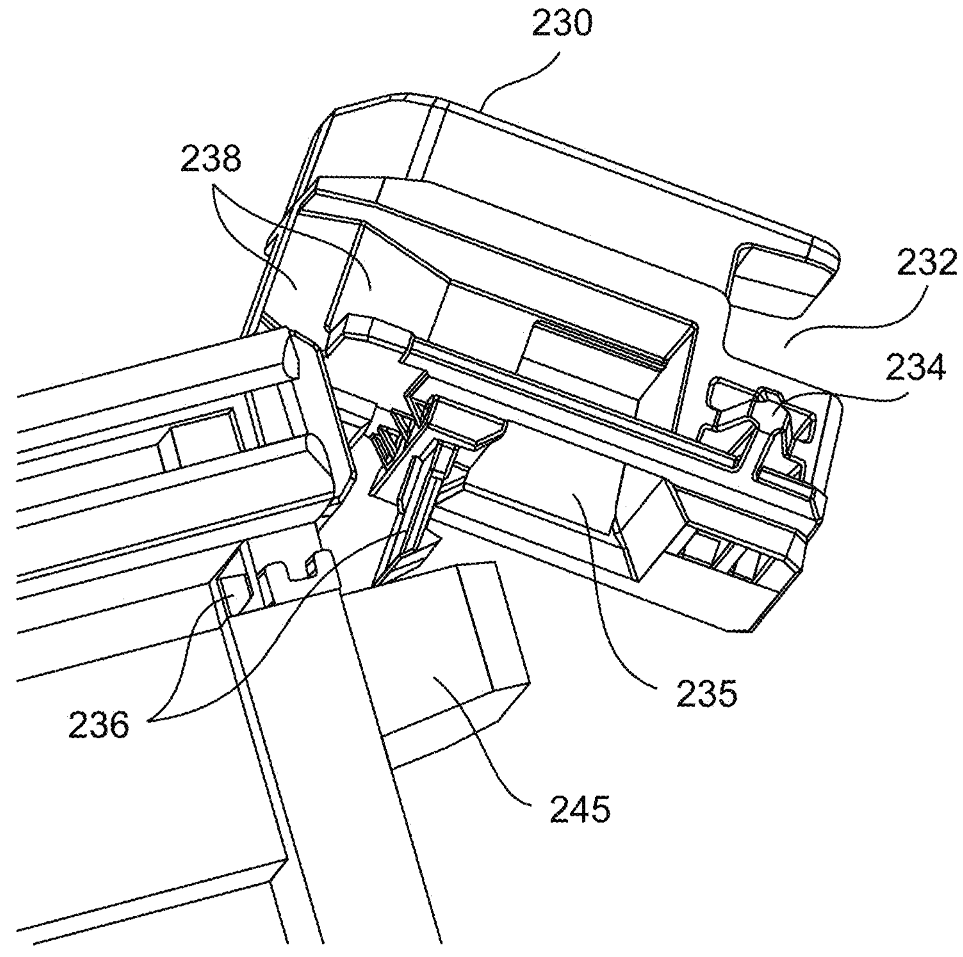
FIG. 2E is a bottom rear side perspective partial view at one end of an exemplary beehive frame cover having rotatable arms and being mounted onto a beehive frame, according to some embodiments.

Reference is also made to FIG. 2E which is a bottom rear side perspective partial view at one end of an exemplary beehive frame cover having rotatable arms and being mounted onto a beehive frame, according to some embodiments.

Figure 2F:
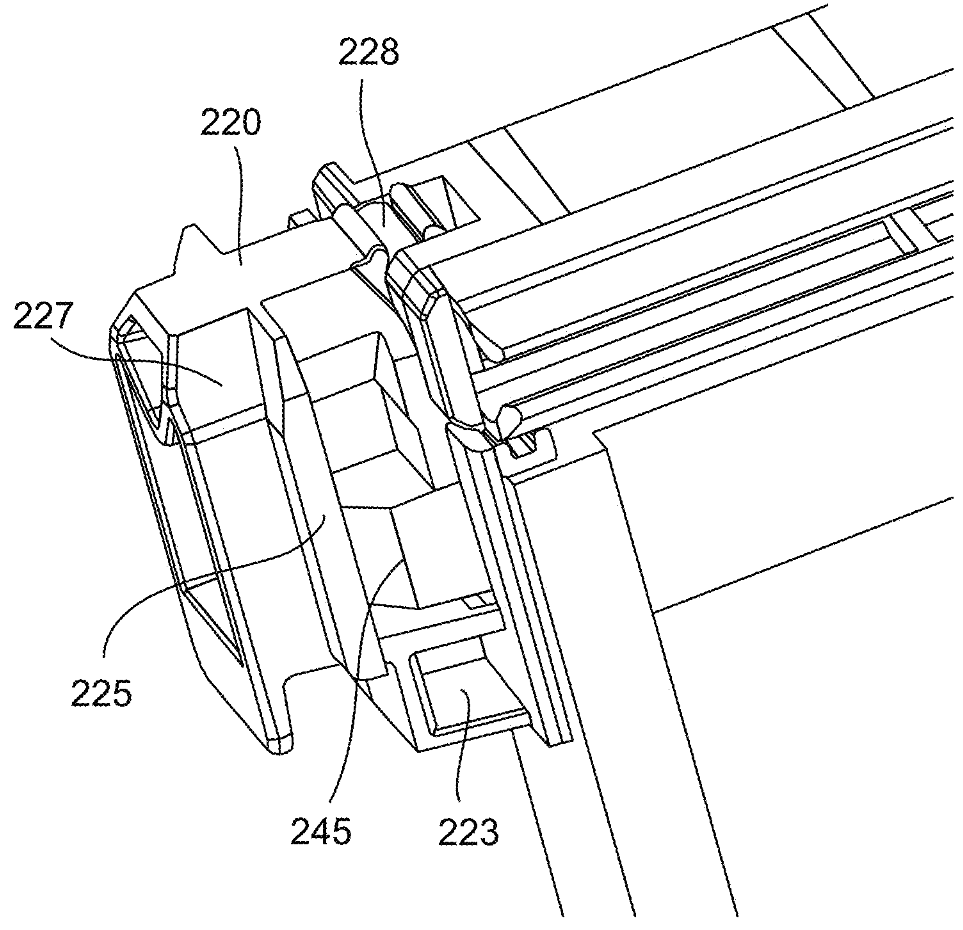
FIG. 2F is a top rear side perspective partial view at another end of an exemplary beehive frame cover having rotatable arms and being mounted onto a beehive frame, according to some embodiments.

Reference is also made to FIG. 2F which is a top rear side perspective partial view at another end of an exemplary beehive frame cover having rotatable arms and being mounted onto a beehive frame, according to some embodiments.

Figure 2G:
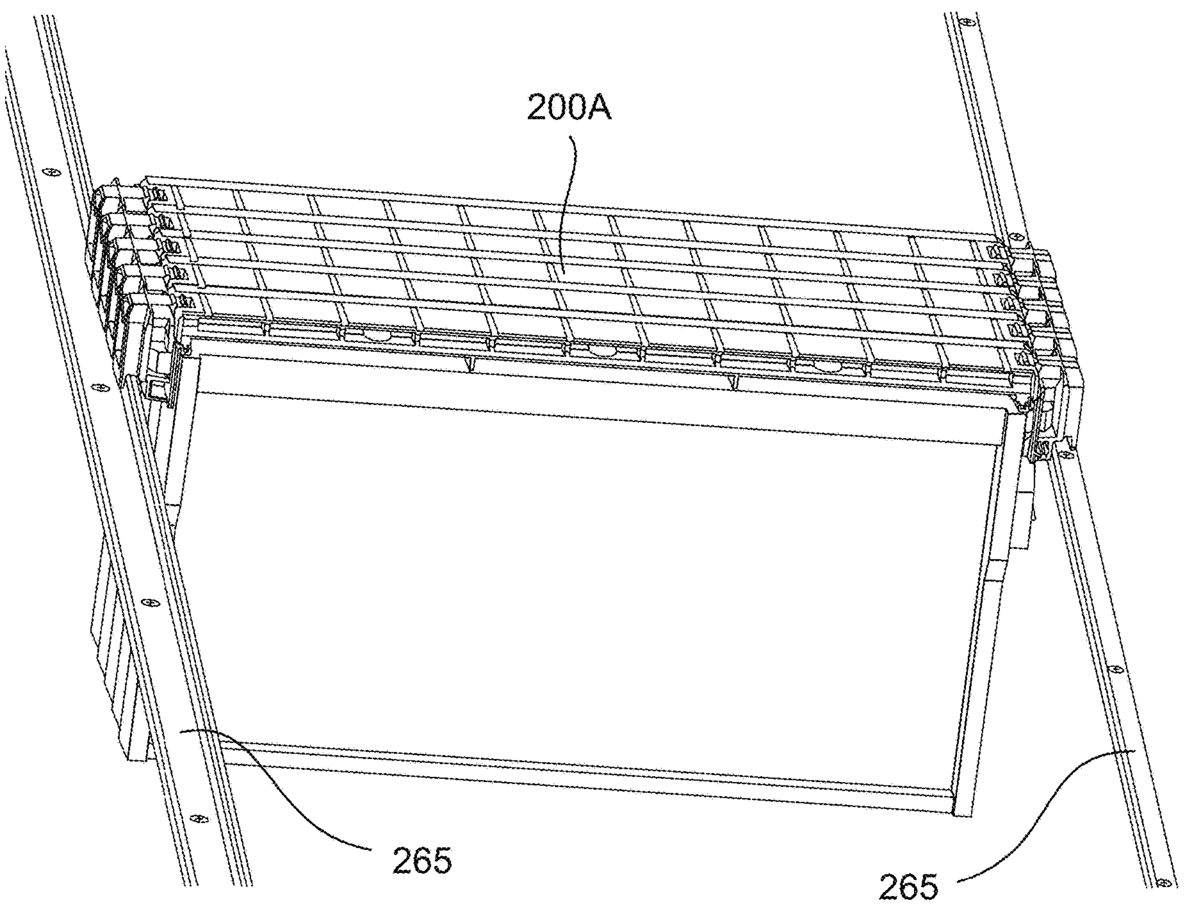
FIG. 2G is a top front side perspective view of plurality of instances of an exemplary beehive frame cover having rotatable arms and mounted onto respective beehive frames, according to some embodiments.

Reference is also made to FIG. 2G which is a top front side perspective view of plurality of instances of an exemplary beehive frame cover having rotatable arms and mounted onto respective beehive frames, according to some embodiments.

A beehive frame 240, such as shown on FIGS. 2D, 2E, 2F, and 2G herein, may be a structure adapted to house a honeycomb and/or brood comb therein, such as discussed herein. For example, the beehive frame 240 may be a Langstroth frame, made of wood, as commercially available and known in the art. Throughout the present disclosure, any one or more instances and/or units of the beehive frame 240 may be individually referred to herein as beehive frame 240 and/or collectively as beehive frames 240, merely for simplicity purposes.

As shown on FIG. 2D, a beehive frame cover 200 may be mounted onto a top bar of a beehive frame 240 such that the elongated body 210 of beehive frame cover 200 may be positioned in juxtaposition and substantially parallel to the top bar. The rotatable arms 220 and 230 of the beehive frame cover 200 may be attached and/or connected to the elongated body 210 at opposite ends thereof along its longitudinal axis, and may be at least partially free to rotate around a transverse axis of the elongated body 210 perpendicular to a plane incident with the beehive frame 240, in and/or out of a position in which one or more of the rotatable arms 220 and 230 engage with and retain at least an end portion of the top bar of the beehive frame 240.

For example, as illustrated on FIG. 2D and at greater detail on FIGS. 2E and 2F herein, the rotatable arms 220 and 230 may be rotated around a transverse axis of the elongated body 210, substantially perpendicular to the beehive frame 240, into and/or out of an open and/or loose position, enabling placing the beehive frame cover 200 on the beehive frame 240, such as shown on FIGS. 2D and/or 2E herein with regard to the rotatable arm 230, and similarly counter-rotated around said transverse axis into and/or out of a closed and/or gripping position in which the beehive frame 240 may be securely gripped and retained thereby, such that beehive frame 240 may be kept attached to the beehive frame cover 200 and carried along therewith, as described herein.

In some exemplary embodiments, and as illustrated for example on FIG. 2E herein, at least one and/or each of rotatable arms 220 and 230 may comprise a groove and/or cavity such as 232 that may be adapted to engage with and/or be seated on a rail, such as 265 illustrated for example on FIG. 2G herein. The corresponding rail 265 adapted to be engaged with the cavity 232 of rotatable arm 220 and/or 230 may be deployed in an internal space portion of a beehive habitat and/or housing, e.g., along walls thereof and/or across one or more opposing planes parallelly to such walls, thereby the cavity 232 when thus seated on the rail 265 may enable to hang the beehive frame 240, and/or slide the beehive frame 240 sideways, e.g., in a forward and/or backward direction along the rail 265. For example, in order to separate at least two respective consecutive units of the beehive frame 240 from one another, e.g., before extracting the beehive frame 240 from a slot and/or location thereof in a beehive habitat, the beehive frame 240 may be pushed and/or forced along and/or in one direction of the rail, and then pushed and/or forced along the opposite direction, thus ungluing the at least two successive instances of the beehive frame 240 from one another.

In some exemplary embodiments, and as illustrated for example on FIG. 2E herein, the rotatable arm 220 and/or 230 may comprise an opening and/or recess such as 235 which may be adapted to house an ear 245 of beehive frame 240 when the rotatable arm 220 and/or 230 being put into a closed, gripping position and/or state, wherein the rotatable arm 220 and/or 230 and the elongated body 210 become substantially perpendicular to one another, such as described and illustrated on FIG. 2F with regard to the rotatable arm 220.

In some exemplary embodiments, and as further illustrated for example on FIG. 2E herein, at least one and/or each of rotatable arms 220 and 230 may comprise a protrusion such as 234 extending outwardly in a lateral direction relative to the beehive frame cover 200, which may enable bringing respective instances of beehive frame 240, onto each of which an instance of the beehive frame cover 200 being mounted, sufficiently close together, e.g., in proximity enabling contact between their respective posts such as 126 of FIG. 1, while keeping them aligned, for example, the protrusion 234 may be adapted to fit into a cavity provided on an opposite lateral end of rotatable arm 220 and/or 230, such as 223 illustrated on FIG. 2F, thereby enabling automatic and/or completely mechanized arrangement of a plurality of beehive frames such as 240 and/or the like, onto which respective instances of beehive frame cover 200 may be mounted.

In some exemplary embodiments, and as yet further illustrated for example on FIG. 2E herein, rotatable arm 220 and/or 230 may comprise a latch, which may be adapted to engage with a keeper and/or strike, e.g. in form of a groove, cavity, opening, and/or the like provided at an end of elongated body 210, so as to form therewith a latching arrangement such as 236 and thereby securely fasten rotatable arm 220 and/or 230 to the beehive frame 240. Optionally the latching arrangement 236 may be further adapted to enable releasing or removing the beehive frame 240, such as for example, by pressing the latch of the latching arrangement 236 upwards to allow sliding thereof out of the keeper thereof at the end of elongated body 210.

Figure 5A:
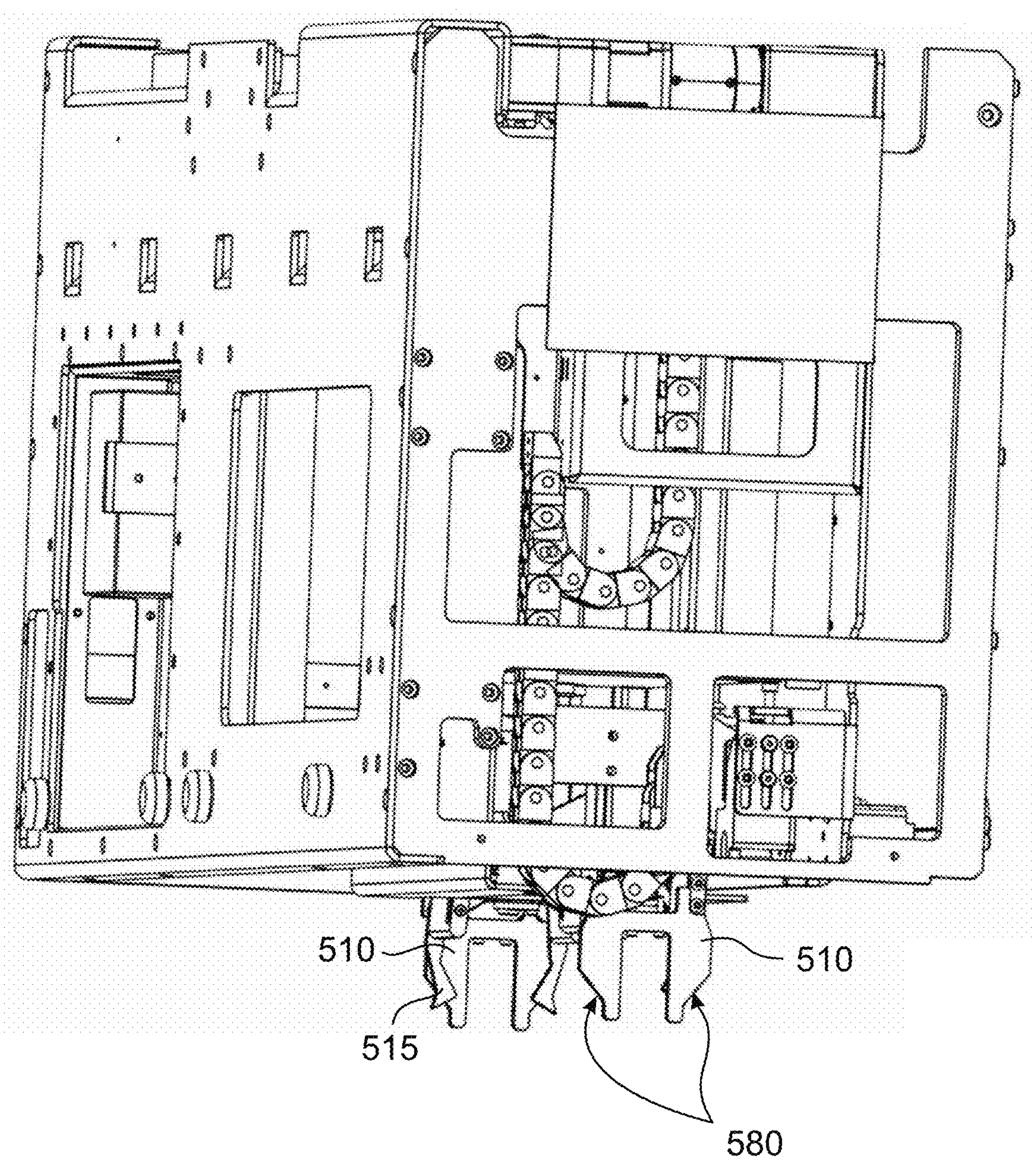
FIG. 5A is a side perspective view of an exemplary frame loader assembly incorporating motorized clamps with downward facing jaws for engaging and retaining a beehive frame cover, according to some embodiments.

In some exemplary embodiments, and as yet further illustrated for example on FIG. 2E herein, rotatable arm 220 and/or 230 may comprise one or more slanted surfaces such as 238, optionally at different and/or opposite orientations, which may be adapted to engage with and/or enable jaws of at least one downward facing clamp to slide into a position in which gripping and retaining of the rotatable arm 220 and/or 230 thereby, such as 515 illustrated and described at further detail herein with reference to FIGS. 5A and/or 5B, may be enabled.

In some exemplary embodiments, and as illustrated for example on FIG. 2F herein, rotatable arm 220 and/or 230 may comprise a cavity such as 223, which may be adapted to house the protrusion 234 of another rotatable arm 220 and/or 230, so as to allow stacking together successive units of beehive frame cover 200 and respective beehive frames 240 onto which each thereof may be mounted. Optionally, the cavity 223 and/or protrusion 234 may be adapted to engage with one another such that a minimal distance between each two adjacent beehive frames 240 thus stacked may be afforded, and/or so that the beehive frames 240 may be kept aligned, e.g., with respect to a beehive habitat and/or one another when pushed into contact, such as for example, by jaws of at least one downward facing clamp, as described and illustrated at further detail herein. Optionally, the minimum distance kept between beehive frames 240 may be of about ⅜ inches, i.e., 9.5 millimeters, and/or the like.

In some exemplary embodiments, and as illustrated for example on FIG. 2F herein, rotatable arm 220 and/or 230 may comprise a side bar such as 225 on at least one and/or each lateral portions thereof, which may be adapted to ensure that a predefined, fixed distance between two adjacent beehive frames 240 onto which respective instances of beehive frame cover 200 are mounted may be kept when the beehive frames 240 are seated in a beehive habitat, such as described and illustrated at further detail herein.

In some exemplary embodiments, and as illustrated for example on FIG. 2F herein, rotatable arm 220 and/or 230 may comprise a surface such as 227 which may be at least partially slanted towards a medial axis of rotatable arm 220 and/or 230 and adapted to house and/or engage with a respective jaw of at least one downward facing clamp such as 510 illustrated and described at further detail herein with reference to FIGS. 5A and/or 5B, additionally or alternatively to the jaws 515 of downward facing clamp(s) for engaging with the slanted surfaces 238 such as illustrated for example on FIG. 2E herein.

In some exemplary embodiments, and as illustrated for example on FIG. 2F herein, rotatable arm 220 and/or 230 may be attached and/or connected to the elongated body 210 along a transverse edge thereof, optionally via a hinge such as 228 and/or likewise adjoining means adapted to securely connect the rotatable arm 220 and elongated body 210 to one another, and further enable twisting and/or rotating the rotatable arm 220 towards and/or away from the elongated body 210 and beehive frame 240, e.g., in order to fasten the beehive frame cover 200 to beehive frame 240 and/or release the beehive frame 240 from beehive frame cover 200, respectively.

As shown on FIG. 2F, when the rotatable arm 220 is placed in a gripping position and/or state, the ear 245 of beehive frame 240 may extend through the opening 235 and thus, with the additional aid of the latching arrangement 236, the beehive frame 240 may be securely connected to the beehive frame cover 200.

In some exemplary embodiments, such as illustrated for example on FIG. 2G herein, a plurality of instances of beehive frame cover 200 may be mounted each on respective beehive frames such as 240 and stacked together in a row, e.g., by being pressed, forced, pushed and/or the like against one another along a longitudinal axis of a beehive habitat, so as to collectively form a contiguous surface, wall, and/or sealed roof 200A above beehive frames 240. Accordingly, the surface and/or roof 200A may be one of six surfaces that define, include and/or enclose a beehive habitat, such as illustrated on FIG. 7 herein.

As further shown on FIG. 2G, the plurality of beehive frame covers 200 may be seated on grooves of rails 265, e.g., using the cavity 232 of rotatable arms 220 and/or 230, thereby hanging and/or suspending the beehive frames 240 above a floor and/or level ground of the beehive habitat accommodating thereof.

In some exemplary embodiments, an assembly and/or combination of the elongated body 210 and rotatable arms 220 and 230 may be used to manipulate components other than beehive frames 240. For example, in addition to a beehive frame regularly used, i.e., a foundation beehive frame in and/or on which bees may build a honeycomb, additional and/or alternative manipulated components may be, for example, each of: a feeding frame adapted for carrying food for consumption by bees; a partition frame for separating hives; a queen excluder frame; a special, dedicated frame carrying sensors and/or treatment components and/or substances; and/or any likewise frame components adapted to be connected to and/or mounted by a beehive frame cover 200 using rotatable arms 220 and 230. Accordingly, beehive frame cover 200 may enable motorized clamps and/or likewise device, tool, and/or arrangement such as described and illustrated herein with reference to FIGS. 5A, 5B, and/or 5C, to carry around, extract and/or place any one of: a beehive frame 240, a feeding frame, a partition frame, a queen excluder frame, a frame carrying sensors, a frame carrying treatment elements or substance, and/or the like.

Figure 3A:
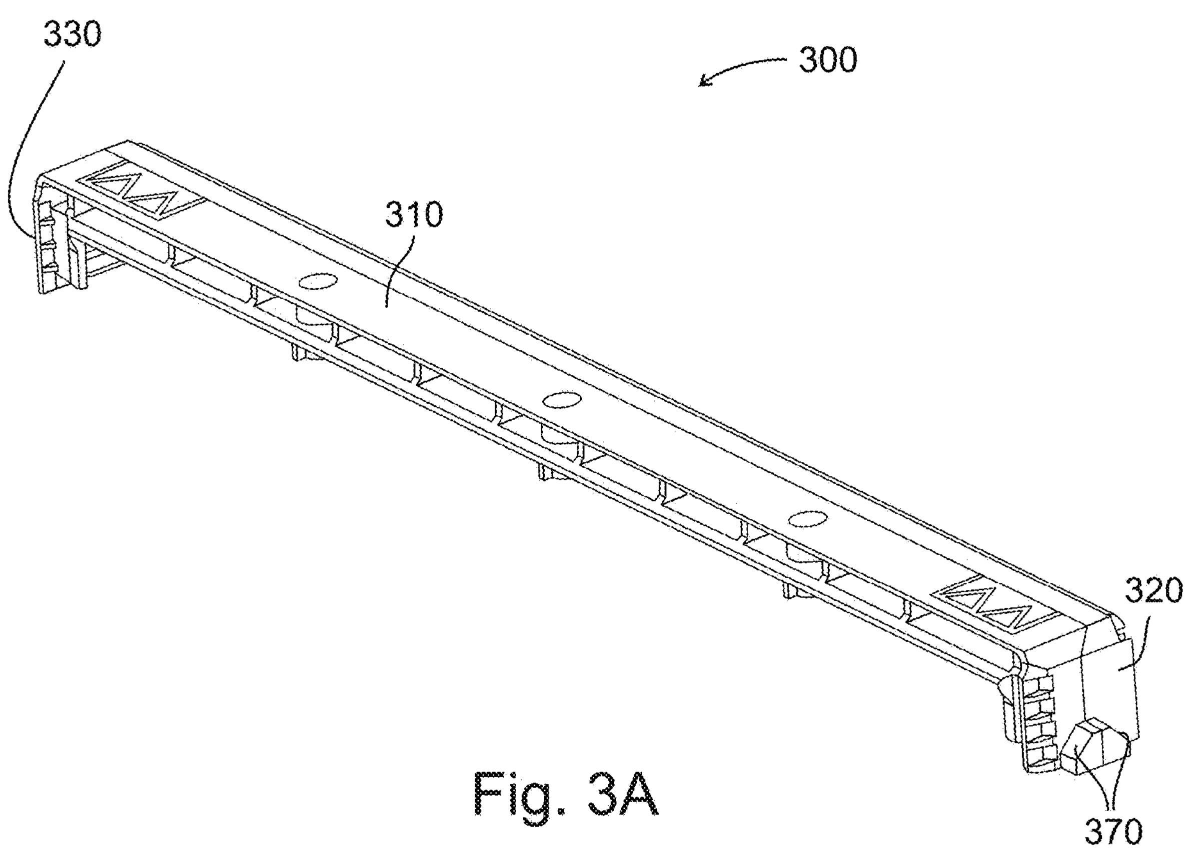
FIG. 3A is a top front side perspective view of an exemplary beehive frame cover monolithically formed as single piece object, according to some embodiments.

Reference is now made to FIG. 3A which is a top front side perspective view of an exemplary beehive frame cover monolithically formed as single piece object, according to some embodiments.

Figure 3B:
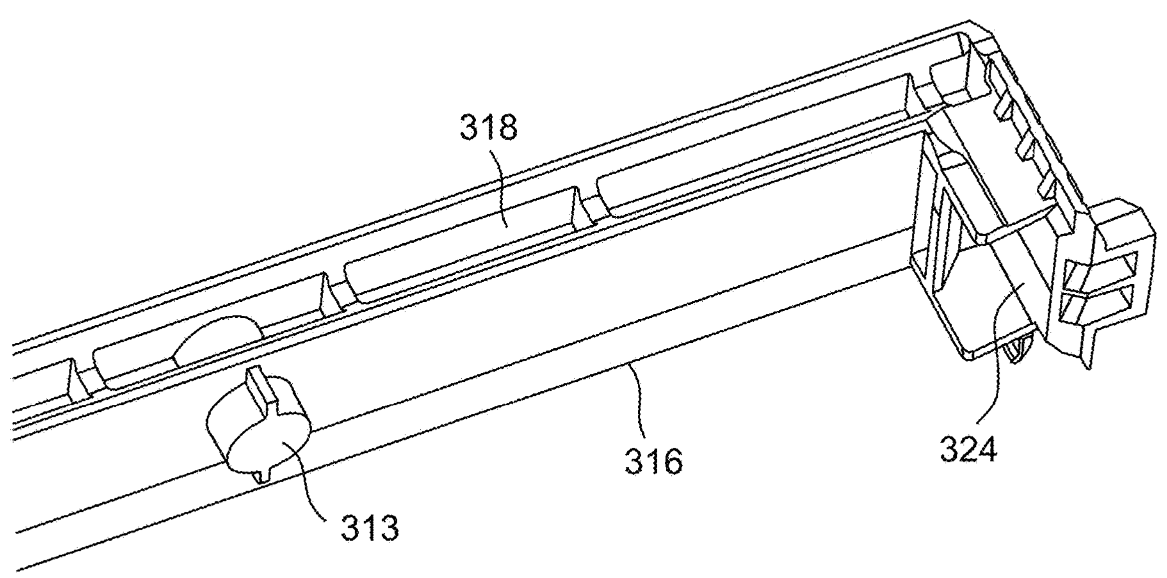
FIG. 3B is a bottom front side perspective partial view at one end of an exemplary beehive frame cover monolithically formed as single piece object, according to some embodiments.

Reference is also made to FIG. 3B which is a bottom front side perspective partial view at one end of an exemplary beehive frame cover monolithically formed as single piece object, according to some embodiments.

Figure 3C:
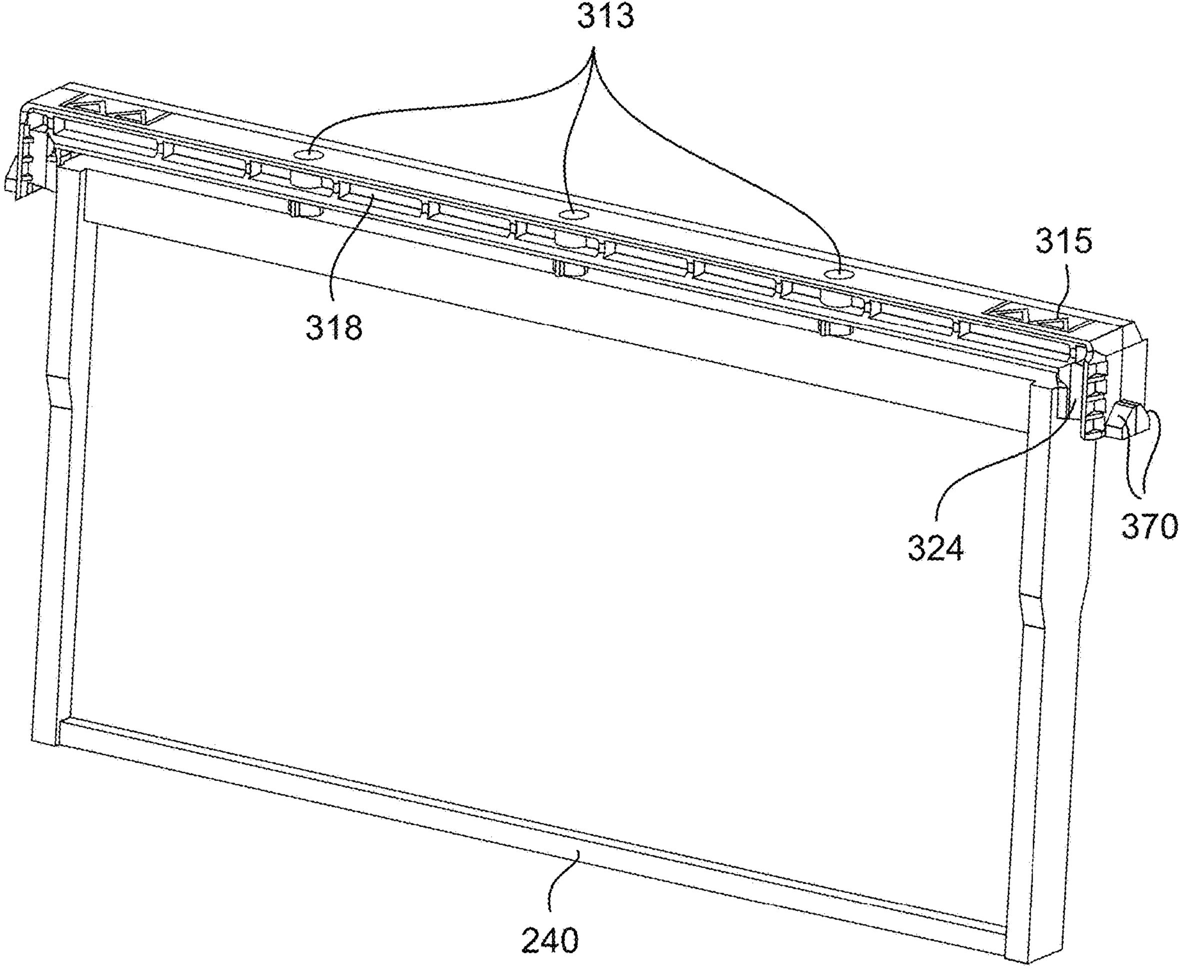
FIG. 3C is a top front side perspective view of an exemplary beehive frame cover monolithically formed as single piece object and mounted onto a beehive frame, according to some embodiments.

Reference is also made to FIG. 3C which is a top front side perspective view of an exemplary beehive frame cover monolithically formed as single piece object and mounted onto a beehive frame, according to some embodiments.

In some exemplary embodiments, a beehive frame cover 300 may comprise an elongated body such as 310 and two arms at opposite ends thereof and extruding downwardly therefrom such as 320 and 330, the elongated body 310 and two arms 320 and 330 integrally composed together so as to form a monolithic object made of one single piece.

The elongated body 310 of the beehive frame cover 300 may be constructed similarly as the elongated body 210 of the beehive frame 200 and adapted in size and shape to cover at least partially a top bar of a beehive frame 240, such as commercially available and/or as described and illustrated herein.

For example, in some exemplary embodiments, the beehive frame cover 300 may comprise a convex shaped portion and/or curved edge, extending along at least a portion of a length of one axial edge of the elongated body 310, such as convex ridge 316, and a concave shaped portion and/or cavity, extending along at least a portion of a length of an opposite axial edge of the elongated body 310, such as concave groove 318. The convex ridge 316 and concave groove 318 may be corresponding to one another and adapted in size and/or shape thereof for engaging together by receiving, into a respective concave groove 318 of one instance of the beehive frame cover 300, a respective convex ridge 316 of another instance of the beehive frame cover 300, such that the convex ridge 316 may be seated in the concave groove 318, thereby and similarly as the convex ridge 216 and concave groove 218 of the frame cover 200, a plurality of instances of the beehive frame cover 300 may be stacked together and engaged with one another to form a contiguous top cover above plurality of beehive frames 240 onto which the plurality of instances of the beehive frame cover 300 may be mounted. The arms 320 and 330 may each comprise a housing and gripping or securing portion designed to engage with and firmly grip a beehive frame 240 when placed juxtaposed against and laterally to each of the respective opposite ends of a top bar of beehive frame 240. For example, as illustrated on FIG. 3B, the arm 320 and/or 330 may be which may comprise a cavity and/or recess such as 324 in an inner portion of arm 320 and/or 330, adapted to receive thereinto and accommodate therein an ear 245 of the top bar of the beehive frame 240 so as to allow mounting of the beehive frame cover 300 onto the beehive frame 240. Optionally, the arms 320 and 330 may be adapted to be snapped to fit onto the top bar of the beehive frame 240 so that the beehive frame cover 300 may be securely fastened to the beehive frame 240 to thereby allow covering thereof at least partially by the elongated body 310 when placed juxtaposed over and parallelly to the top bar of the beehive frame 240.

Figure 5B:
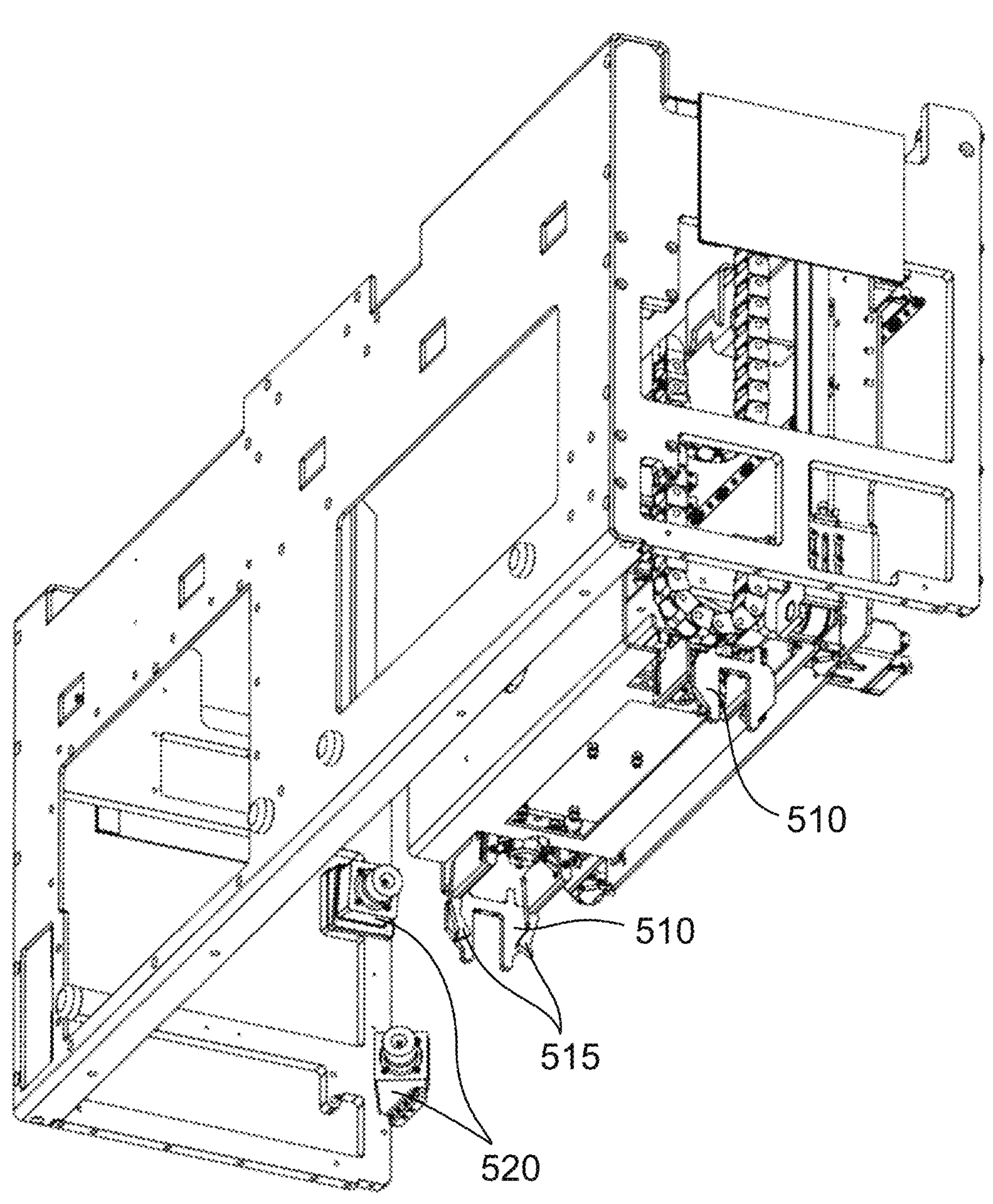
FIG. 5B is a bottom front side perspective view of an exemplary frame loader assembly incorporating motorized clamps with downward facing jaws for engaging and retaining a beehive frame cover, according to some embodiments.

In some exemplary embodiments, the beehive frame cover 300 may comprise, on an exterior region of at least one of the arms 320 and 330 facing outwardly and away from the elongated body 310 and top bar of beehive frame 240, a protruding portion having at each of opposing sides of the arm a slanted and/or inclined surface boundary and/or ramp facing laterally from the beehive frame, such as slanted surfaces 370, which may be adapted to enable separation of the beehive frame 240 from one or more other, neighboring beehive frame 240 by exertion of mechanical force on the arm 320 and/or 330 at the protruding portion for displacing the neighboring beehive frame(s) 240 sideways, for example, using jaws of at least one downward facing clamp, such as described and illustrated at further detail with reference to FIGS. 5A, 5B, and/or 6 herein.

In some exemplary embodiments, the beehive frame cover 300 may comprise and/or be provided with one or more cavities, holes, bores, and/or the like such as 313 which may be used to provide access to the beehive frame 240 and/or top bar thereof at the least, for probing, sensing, measuring and/or the like various aspects, properties, conditions, and/or related information of beehive frame 240. The cavities or holes 313 may be constructed such that a bottom and/or lower surface thereof may reach and/or touch beehive frame 240 and/or top bar thereof when the beehive frame cover 300 is mounted on and/or otherwise attached to the beehive frame 240, thereby enabling, for example, to measure a temperature of the beehive frame 240 which may be approximately same and/or similar to a temperature measured at a lower part of any one of the cavities 313. For example, by analyzing a reflection of an infrared (IR) and/or other radiation directed into a cavity 313, the temperature of the beehive frame 240 covered by the beehive frame cover 300 may be accurately determined.

In some exemplary embodiments, the beehive frame cover 300 may comprise on an exterior surface and/or facet thereof an alignment pattern such as 315, thereby allowing automatically positioning over specific beehive frame 240 and/or beehive frame cover 300 an apparatus and/or assembly for manipulation of beehive frames 240, such as the clamp(s) and/or frame loader as described and illustrated at further detail with reference to FIGS. 5A, 5B, and/or 6 herein.

Figure 4:
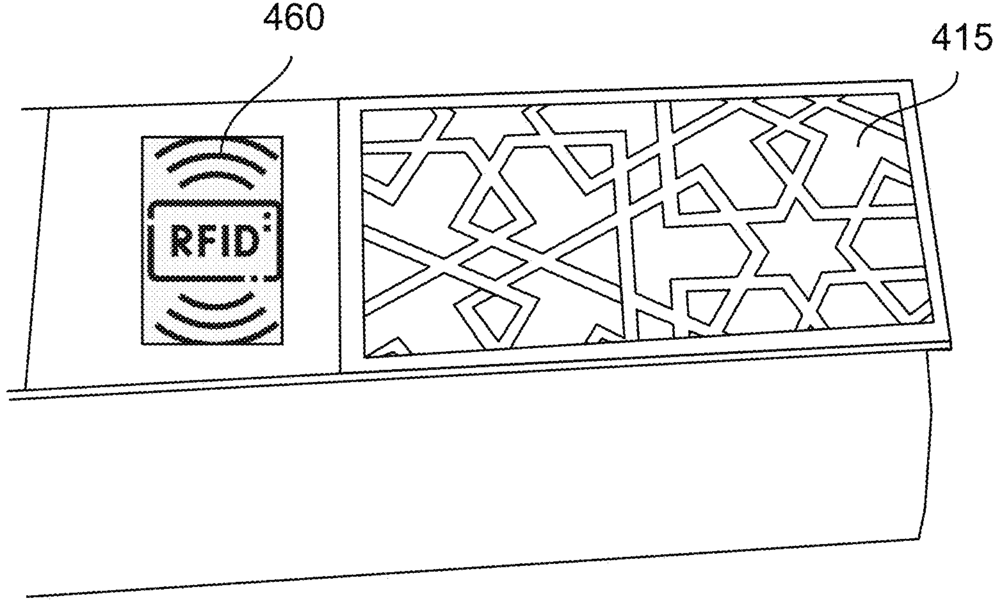
FIG. 4 is a schematic top front partial view of a beehive frame cover and illustrative exemplary alignment pattern and identification tag applied thereto, according to some embodiments.

Reference is now made to FIG. 4 is a schematic top front partial view of a beehive frame cover and illustrative exemplary alignment pattern and identification tag applied thereto, according to some embodiments. The alignment pattern 415 as shown in FIG. 4 illustrates an exemplary manner in which the alignment pattern 315 such as provided on beehive frame cover 300 may be constructed and implemented.

As shown on FIG. 4, alignment pattern 415 may comprise a plurality of shapes and/or lines which, even if slightly obstructed and/or covered in part (e.g., by honey and/or wax) may enable to perform alignment based on captured imagery data thereof, e.g., by an imaging sensor and a processing circuitry and/or the like.

As further shown on FIG. 4, an identification component and/or element such as a beehive frame identifier 460 may be provided in addition to and/or aside of the alignment pattern 415, i.e., at proximate location on the beehive frame cover and/or at other likewise position accessible by a corresponding identification detector and/or reader. For example, a radio frequency identification (RFID) and/or near field communication (NFC) tag, chip, print and/or the like on each of a plurality of instances of the beehive frame cover 300 may be used to identify each of a respective plurality of beehive frames 240 onto which plurality of instances of the beehive frame cover 300 may be mounted.

For example, information regarding a health, state, status, and/or the like of each beehive frame 240 may be recorded and stored, whereas future retrieval and/or access to the information may be enabled based on a unique identifier associated with a unique identification (e.g., RFID) of beehive frame identifier 460. Additionally or alternatively, one or more automated and/or autonomous beekeeping operations may be carried out utilizing the RFID and/or other identification as read from the beehive frame identifier 460, thereby enabling to determine, identify and/or ascertain based thereon that the beehive frame 240 at hand is indeed the correct one.

Reference is now made to FIG. 5A which is a side perspective view of an exemplary frame loader assembly incorporating motorized clamps with downward facing jaws for engaging and retaining a beehive frame cover, according to some embodiments.

Reference is also made to FIG. 5B which is a bottom front side perspective view of an exemplary frame loader assembly incorporating motorized clamps with downward facing jaws for engaging and retaining a beehive frame cover, according to some embodiments.

Figure 5C:
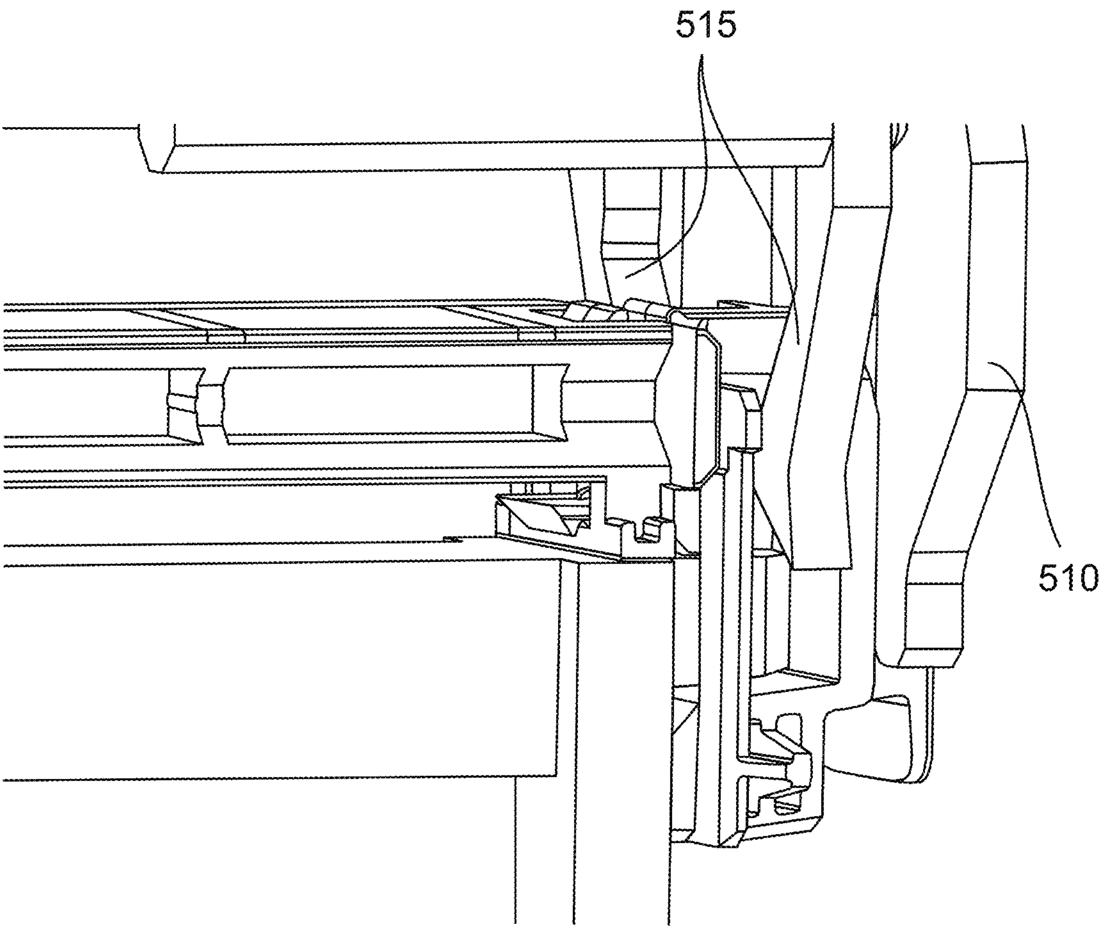
FIG. 5C is a front side perspective partial view of an exemplary beehive frame cover having rotatable arms, engaged with and retained by downward facing jaws of motorized clamps, according to some embodiments.

Reference is also made to FIG. 5C which is a front side perspective partial view of an exemplary beehive frame cover having rotatable arms, engaged with and retained by downward facing jaws of motorized clamps, according to some embodiments.

Figure 6:
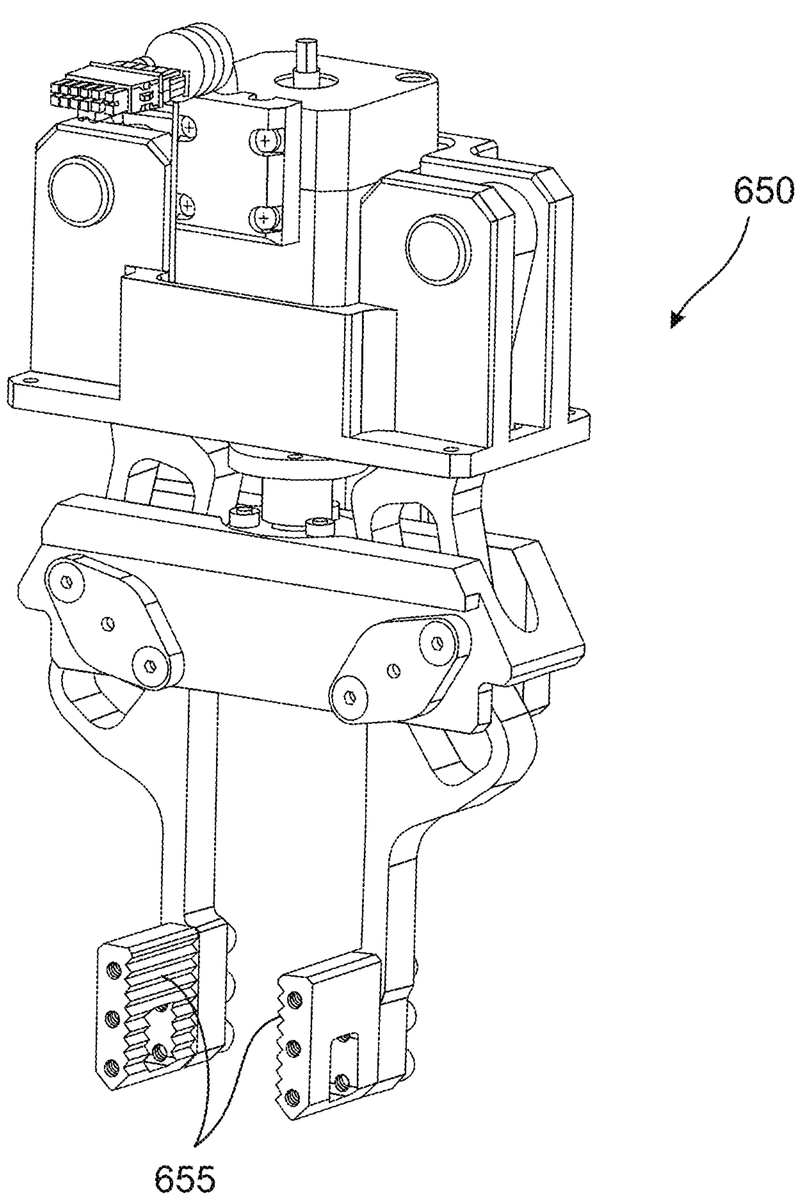
FIG. 6 is a top front side perspective view of an exemplary clamp with downward facing jaws having jagged surfaces for engaging and retaining a beehive frame cover, according to some embodiments.

Reference is also made to FIG. 6 which is a top front side perspective view of an exemplary clamp with downward facing jaws having jagged surfaces for engaging and retaining a beehive frame cover, according to some embodiments.

In some exemplary embodiments, and as shown on FIGS. 5A and/or 5B, a frame loader assembly, such as 725 further described and illustrated with reference to FIG. 7 herein, may comprise one or more pairs of jaws of downward facing clamps such as 510 and/or 515, adapted to engage with and retain a beehive frame cover such as 200 and/or 300 as disclosed herein, along with a beehive frame 240 onto which the beehive frame cover 200 and/or 300 may be mounted, thereby allowing translating and/or carrying the beehive frame 240 and/or otherwise manipulating thereof and/or interacting therewith for performing one or more beekeeping operations thereon as described herein.

Although, for the sake of clarity and simplicity, the only sensors shown as included in frame loader 725 are cameras 520 in FIG. 5B it will be understood that any sensors can be included in frame loader 725. For example, in addition to cameras 520, frame loader 725 can include heat or thermal sensors, chemical sensors, volume sensors, fluid sensors, photoelectric sensors, acoustic sensors and/or the like. Frame loader 725 can include wired and/or wireless receivers, transmitters, transceivers, and/or the like, e.g., frame loader 725 can include transmitters/receivers used for identifying radio frequency identification (RFID) tags and/or near field communication (NFC) chips enabling frame loader 725 to identify frames based on identifiers 460 etc. Accordingly, frame loader 725 can be, or it can act or be used as a mobile monitoring unit which can move around within a system, reach a specific frame, load the frame into a dedicated space within the frame loader and, using the included sensors, monitor the frame and included honeycomb.

Moreover, frame loader 725 may be, or it may function as a treatment unit in addition and/or alternatively to 720. For example, frame loader 725 may include a heater, a radiation emitting element, a substance emitting unit (e.g., a spraying nozzle or orifice) or frame loader 725 may include a mechanical component such as a rod or needle that may puncture cells in a honeycomb in a frame loaded into frame loader 725. Accordingly, frame loader 725 may be a mobile treatment unit that may move around the inside of a habitat, reach a specific frame including a honeycomb, extract the frame with the included honeycomb and treat it, e.g., disinfect a honeycomb, destroy queen larvae in order to prevent swarming etc.

In some exemplary embodiments, the jaws 510 and/or 515 may comprise on exterior portions thereof slanted and/or inclined surfaces and/or ramps such as 580, adapted to engage with respective slanted and/or inclined surfaces and/or ramps such as 238 and/or 227 as may be provided on rotatable arm 220 and/or 230 of the beehive frame cover 200. Additionally or alternatively, the slanted surfaces and/or ramps 580 may be adapted to engage with respective slanted surfaces and/or ramps 370 of the beehive frame cover 300.

Accordingly, in some exemplary embodiments, when the jaws 510 and/or 515 are lowered over a target beehive frame cover 300, for example, the slanted surfaces 580 of jaws 510 may push surfaces 370 of adjacent beehive frame cover(s) 300, pushing adjacent beehive frames 240 (e.g., honeycombs) onto which such adjacent beehive frame cover(s) 300 may be mounted, away from a respective target beehive frame 240 attached to the target beehive frame cover 300 and thus separating the adjacent beehive frames 240 from the target beehive frame 240.

In some exemplary embodiments, jaws 510 may be lowered along surfaces 227 on both sides of a beehive frame cover 200 such that the jaws 510 may hold the beehive frame cover 200 and/or beehive frame 240 covered thereby at both sides thereof. Optionally additional jaws such as 515 may also be provided and used for gripping, clamping and/or holding a beehive frame 240, in a manner such as illustrated on FIG. 5C.

Accordingly, when jaws 510 are placed over rotatable arm 220 and/or 230, and the frame loader assembly moves along a transverse axis relative to beehive frame cover 200 (e.g, the X axis of coordinate system 755 of FIG. 7 herein), the beehive frame 240 may be moved with it along the transverse axis. For example, in order to unglue and/or release a beehive frame 240, e.g., from neighboring beehive frames 240, from a rail such as 265 and/or other elements, using jaws 510 and/or 515 the frame loader assembly may manipulate and/or carry a beehive frame 240 back and/or forth along the transverse axis.

In some exemplary embodiments, the jaws 515 may be designed and adapted to, when lowered, slide along surfaces 238 and clamp rotatable arm 220 and/or 230 thus the frame loader assembly to lift, and/or extract a beehive frame 240 from a pre-existing place thereof in a habitat. For example, frame loader assembly may lift a beehive frame 240 such that imagery data of the beehive frame 240 may be obtained by one or more imaging sensors provided on the frame loader assembly such as cameras 520. Additionally or alternatively, the frame loader assembly may lift and/or extract a beehive frame 240 from a pre-existing location thereof, carry the beehive frame 240 to a treatment unit such as 720 of FIG. 7 herein, place the beehive frame 240 in the treatment unit, extract the beehive frame 240 from treatment unit, carry the beehive frame 240 to a location in the habitat, and place and release the beehive frame 240 in the location.

In some exemplary embodiments, and as illustrated on FIG. 6 herein, a downward facing clamp such as 650 adapted for gripping, clamping, and/or holding a beehive frame 240 and/or beehive frame cover 200 or 300 mounted on the beehive frame 240 may be utilized, for example, the downward facing clamp 650 may be incorporated, integrated into, and/or employed within frame loader assembly such as 725 illustrated on FIG. 7 herein, and used for lifting and/or extracting the beehive frame 240 from a location thereof within a beehive habitat. Optionally, the downward facing clamp 650 may be further adapted to, e.g., using an eccentric cam assembly and/or the like, shake the beehive frame 240 gripped thereby such that bees on beehive frame 240 may be forced to disengage and/or drop of the beehive frame 240. As shown on FIG. 6, the downward facing clamp 650 may be equipped with a jaw having jagged surfaces such as 655. Jagged or saw-tooth like surfaces 655 may be used to firmly grip beehive frame 240, e.g., by gripping the side bars of a beehive frame 240.

Reference is made to FIG. 7 which is a schematic illustration of an exemplary automated beehive 700 in which instances of a beehive frame cover are adapted to be deployed and utilized, according to some embodiments. For illustrative purposes and ease of understanding, in FIG. 7 the automated beehive 700 is shown with parts of walls and/or roof thereof removed, in a manner that is meant to enable a view of internal parts as well.

As shown on FIG. 7, as well as surrounding walls and optionally a floor, the automated beehive 700 may comprise a top cover and/or roof 710 where a solar panel may be installed, thus enabling automated beehive 700 to self-generate power and operate autonomously using own energy supply for carrying out various beekeeping operations automatically and/or on-demand. For example, such operations as described herein may comprise and/or be performed with respect to, for example, selectively removing and/or inserting beehive frames, monitoring and/or sensing beehive frames and/or beehive portions, treating fames, and/or the like, may all be done automatically and/or autonomously, e.g., based on decisions and/or selections of a beehive control & management circuitry 702 and/or any likewise suitable computing apparatus and/or system for automated beekeeping operations, and respective control commands sent thereby to actuators mechanically operated within the automated beehive 700, as described herein.

The automated beehive 700 may be adapted to accommodate a plurality of beehive frames 240 which may be structures that house a honeycomb and/or brood comb in each, such as discussed herein. The beehive frames 240 may be collectively referred to hereinafter as beehive frames 240 or individually as beehive frame 240, merely for simplicity purposes. For example, beehive frame 240 may be a Langstroth frame, optionally made of wood, as commercially available and known in the art. As shown on FIG. 7, a plurality of beehive frames 240 may be arranged in several rows along the automated beehive 700, for example, automated beehive 700 may house up to about one hundred and fifty (150) frames 240. Honeycombs may be built on and/or in frames 240. The automated beehive 700 may be provided with plurality of openings such as 750 thereby enabling bees to enter and exit automated beehive 700.

The automated beehive 700 may comprise a mechanism and/or assembly such as frame loader 725, adapted to manipulate and/or inspect individual beehive frames such as 240. The frame loader 725, also referred to herein as "frame loader robot" or "robot", may be adapted to extract a frame 240 from an accommodation thereof within the automated beehive 700, acquire and/or gather sensory data from the frame 240, using at least sensor deployed on the frame 240 and/or mounted on the frame loader 725, analyze the sensory data related to the frame 240 to determine characteristics thereof, e.g., contents, condition, and/or the like, treat the frame 240, carry and move the frame 240 to a target destination in the automated beehive 700, e.g., place the frame 240 in a different location and/or slot, in treatment unit 720, and/or the like. In some embodiments, the frame loader 725 may comprise at least one clamp with downward facing jaws, adapted to engage with a beehive frame cover mounted onto a beehive frame, and to retain the cover and frame for manipulation thereof, such as shown and illustrated on FIGS. 5A, 5B, and/or 5C herein.

The frame loader 725 may be adapted to move in, and/or along X and Y coordinates and/or axes, such as X, Y and Z coordinates of coordinate system 755 as shown on FIG. 7. At least one downwards facing clamp jaws in frame loader 725 such as exemplary jaws 510, 515 and/or 655 as illustrated on FIGS. 5A, 5B, and/or 5C and described herein, may be adapted to move in, or along the Z coordinate of coordinate system 755 as shown on FIG. 7. Accordingly, frame loader 725 may be placed above any frame 240 in automated beehive 700. Although only two rows of frames 240 are shown in system 700 it will be understood that frame loader 725 may be adapted and/or modified to reach any number of frames in any one of the X and Y directions of coordinate system 755. For example, automated beehive 700 may be adapted to accommodate three or more rows of frames 240 that may be longer or shorter than as illustrated on FIG. 7. For example, a first automated beehive 700 may be designed such that it can be extended by connecting to it a second automated beehive 700 such that frame loader 725 may be able to manipulate frames in the two, combined beehives. Optionally, automated beehive 700 may be extendable so as to provide additional capacity using a same single set of resources, e.g., a single frame loader 725 and a single treatment unit 720 can serve bee colonies in an extended automated beehive 700.

The automated beehive 700 may comprise at least one treatment unit 720, which may be a device and/or assembly adapted to treat a beehive frame 240. For example, treatment unit 720 may disinfect a beehive frame 240, e.g., using heat, radiation, chemical substance, compressed gas and/or substance, and/or by applying a mechanical component, such as a rod, needle, and/or the like, and/or by any combination of such treatment tools and/or techniques.

The automated beehive 700 may comprise one or more substance tanks 730, which may be adapted to receive and/or contain various substances, e.g., sugar, syrup, pesticides, and/or the like.

In some exemplary embodiments, the automated beehive 700 may comprise a feeder 715 which may be adapted to feed bees accommodated in the automated beehive 700, e.g., on and/or among the beehive frames 240 and/or a portion thereof. For example, the feeder 715 may be adapted to fill one or more feeding frames (e.g., as may be carried to the feeder 715 by frame loader 725), e.g., feeder 715 may pump syrup from one of substance tanks 730 into a feeding frame and/or the like.

The automated beehive 700 may employ a plurality of instances and/or units of a beehive frame cover 200 such as described and illustrated herein. The beehive frame cover 200 may be a structure adapted to grip a beehive frame 240 and hold or keep the beehive frame in place. For example, beehive frame cover 200 may be designed to grip and hold a beehive frame 240 and may include a groove and/or notch that sits on rails (e.g., rails 265 as further described herein with reference to FIG. 2G) along walls or sides of automated beehive 700. Optionally, onto each beehive frame 240 housed in automated beehive 700 there may be mounted a respective beehive frame cover 200.

The plurality of instances and/or units of the beehive frame cover 200 may be collectively referred to herein as beehive frame covers 200 and/or individually as beehive frame cover 200, merely for simplicity purposes. It will be appreciated that while on FIG. 7 the automated beehive 700 illustrated employs the beehive frame covers 200 in accordance with some exemplary embodiments such as described and illustrated with reference to FIGS. 2A-2G herein, other suitable types of beehive frame covers, such as for example, instances of beehive frame cover 300 in accordance with some further exemplary embodiments as described and illustrated with reference to FIGS. 3A-3C may be employed just as well without loss of generality of the disclosed subject matter.

The automated beehive 700 may comprise a power source 745 which may be, for example, a battery (e.g., one charged and/or chargeable by a solar panel) and/or a generator, e.g., one operated by fuel and/or the like.

The automated beehive 700 may comprise a beehive control & management circuitry 702 which may be for example an apparatus such as described herein with reference to FIG. 8 herein, adapted to monitor the beehive frames 240, beehive habitat, and/or bees in automated beehive 700 to determine and order commands (e.g., by wired and/or wireless transmission to one or more actuators and/or the like) for performing beekeeping operations accordingly by one or more other components of automated beehive 700 such as for example, the frame loader 725, feeder 715, treatment unit 720, and/or the like, to communicate and/or exchange data with external and/or remote devices, resources, sensors deployed in and/or on beehive frames 240 and/or elsewhere within automated beehive 700 and/or outside thereof, and/or with any likewise data generator and/or consumer, and/or to carry out any likewise similar control and/or management tasks with relation to the automated beehive 700. For example, commands from the beehive control & management circuitry 702 may cause components of automated beehive 700 to open or close a valve, activate a camera, an electric motor or engine, and/or the like, close or open an electrical circuit, flip a switch and so on.

Reference is now made to FIG. 8 is a schematic block diagram of an exemplary apparatus for control and management of an automated beehive in which instances of a beehive frame cover are adapted to be deployed and utilized, according to some embodiments. An exemplary apparatus 800 may be used for performing one or more of the acts for beehive operation and/or beekeeping such as described herein.

The apparatus 800 may comprise and/or be implemented as, for example, a computer, a server, a computing node, a cluster of computing nodes and/or the like, which may include an Input/Output (I/O) interface 810 for connecting to one or more external devices, systems, services and/or the like, one or more processor(s) 812 for executing a process such as any one or more of operations for control and management of automated beehive 700 as described and illustrated herein with reference to FIG. 7, a storage 814 for storing data and/or code (program store), and/or the like.

The apparatus 800 may be deployed in and/or be in communication with a beehive 801, which may optionally be an automated beehive such as 700 of FIG. 7 as described and illustrated herein. Optionally, the apparatus 800 may be adapted to operate, control, and/or communicate with one or more sensors 803 located in the beehive 801 and/or whereabouts thereof and adapted to acquire sensory data related to the beehive 801 and/or to bees and/or colonies accommodated therein. Additionally or alternatively, the apparatus 800 may be adapted to operate, control, and/or communicate with one or more actuators 805 of the beehive 801 which may be adapted to carry out beekeeping tasks in the beehive 801 in an automated and/or autonomous manner, such as described and illustrated herein.

In some exemplary embodiments, the beehive 801 may comprise at least one habitat of bees, which may be, for example, a space defined by an encasing and/or housing with walls and a floor, optionally with one or more ground level surfaces, one or more partition frames, a roof, and/or the like. Otherwise described, a habitat or habitats as referred to herein may be spaces similar to an internal space of a Langstroth beehive. the beehive 801 may comprise a single habitat, and/or a plurality of habitats, e.g., using partition frames to separate one colony from another. It will be understood that where applicable reference to a habitat includes reference to multiple habitats as well.

In some exemplary embodiments, a habitat within beehive 801 may be a dedicated, confined space optionally suitable for housing a plurality of beehive frames where specific conditions, e.g., temperature, moisture and/or the like may be maintained. For example, a habitat may be the space occupied by beehive frames 240 as illustrated on FIG. 7 where such habitat may be separated and/or isolated from other parts of the beehive 801, e.g., and as illustrated on FIG. 7, walls may separate a space (i.e., habitat) occupied by beehive frames 240, substance tanks 730, treatment unit 720, feeder 715, and/or the like. Optionally, conditions in a habitat may be controlled, e.g., humidity, temperature, and/or the like in a habitat may be continuously monitored, controlled, and/or managed, optionally using the sensor(s) 803 and/or actuator(s) 805, for example, via climate control apparatus (e.g., an air conditioner, fan, ventilator, heater, and/or the like). Optionally, sensor(s) 803 may include sensor(s) installed in and/or on any one of beehive frames 240. Optionally, actuator(s) 805 may include a frame loader assembly such as 725 for manipulation and/or interaction with any one of beehive frames 240. Optionally, one or more other components such as feeder 715, treatment unit 720, substance tanks 730, and/or the like may be operated, controlled, and/or communicated by actuator(s) 805.

In some exemplary embodiments, deployment and/or activation of the sensor(s) 803 in and/or on any one of the beehive frames 240, and/or manipulation and/or interaction with any one of the beehive frames 240 by the actuator(s) 805, may be enabled, supported, and/or facilitated at least in part via use of a beehive frame cover such as 200 and/or 300 as disclosed herein which may be mounted onto a respective one of the beehive frames 240 in the beehive 801.

The I/O interface 810 may include one or more wired and/or wireless network interfaces for connecting to a network 802 comprising one or more wired and/or wireless networks, for example, a Local Area Network (LAN), a Wide Area Network (WAN), a Metropolitan Area Network (MAN), a cellular network, the internet and/or the like. Using the network interface(s) the apparatus 800 may communicate, optionally via the network 802, with one or more (optionally remote, e.g., networked) resources 806, which may optionally comprise and/or be implemented as, for example, a server, a computing node, a storage server, a networked database, a cloud service and/or the like. Through the network 802 and/or otherwise, the apparatus 800 may optionally further communicate with one or more client terminals 804, for example, a computer, a server, a laptop, a mobile device and/or the like used by one or more users, for example, an operator, a researcher, an analyst, a system administrator, an information technology (IT) expert, and/or the like. Optionally one or more of the client terminals 204 and/or resources 806 may reside at and/or be coupled to the apparatus 800 locally.

The I/O interface 810 may further include one or more wired and/or wireless I/O interfaces, ports, interconnections and/or the like for connecting to one or more external devices, for example, a Universal Serial Bus (USB) interface, a serial interface, a Radio Frequency (RF) interface, a Bluetooth interface and/or the like. Through the I/O interface 810, the apparatus 800 may communicate with one or more external devices (not shown) attached to the I/O interface(s), for example, an attachable mass storage device, an external media device and/or the like.

The processor(s) 812, homogenous or heterogeneous, may include one or more processing nodes arranged for parallel processing, as clusters and/or as one or more multi core processor(s).

The processor(s) 812 may execute one or more software modules such as, for example, a process, a script, an application, an agent, a utility, a tool, an Operating System (OS) and/or the like each comprising a plurality of program instructions stored in a non-transitory medium (program store) such as the storage 814 and executed by one or more processors such as the processor(s) 812. The processor(s) 812 may further include, utilize and/or otherwise facilitate one or more hardware modules (elements), for example, a circuit, a component, an integrated circuit (IC), an Application Specific Integrated Circuit (ASIC), a Field Programmable Gate Array (FPGA), a Digital Signals Processor (DSP), a Graphic Processing Units (GPU), an Artificial Intelligence (AI) accelerator and/or the like.

The processor(s) 812 may therefore execute one or more functional modules utilized by one or more software modules, one or more of the hardware modules and/or a combination thereof. For example, the processor(s) 812 may execute a beehive operator functional module 820 for operating, controlling, and/or communicating with the sensor(s) 803 and/or actuator(s) 805 to carry out any one of monitoring and/or treatment tasks with relation to beehive frames 240, and/or performing any likewise related beekeeping and/or beehive habitat maintenance functions, in accordance with some embodiments.

The storage 814 may include one or more tangible, non-transitory persistent storage devices, for example, a hard drive, a Flash array and/or the like. The storage 814 may also include one or more volatile devices, for example, a Random Access Memory (RAM) component, a cache and/or the like. The storage 814 may further comprise one or more local and/or remote network storage resources, for example, a storage server, a Network Attached Storage (NAS), a network drive, a cloud storage service and/or the like accessible via the I/O interface 810.

Optionally, the apparatus 800, specifically the beehive operator 820 may be utilized by one or more cloud computing services, platforms and/or infrastructures such as, for example, Infrastructure as a Service (IaaS), Platform as a Service (PaaS), Software as a Service (SaaS) and/or the like provided by one or more vendors, for example, Google Cloud, Microsoft Azure, Amazon Web Service (AWS) and Elastic Compute Cloud (EC2) and/or the like.

One or more of the client terminals 804 may execute one or more applications, services and/or tools for communicating with the apparatus 800 and more specifically with the beehive operator 820 to enable one or more of the users to interact with the beehive operator 820. For example, one or more client terminals 804 may execute a web browser for communicating with the beehive operator 820 and presenting a User Interface (UI), specifically a Graphical UI (GUI) which may be used by the respective users to interact with the beehive operator 820. In another example, one or more client terminals 804 may execute a local agent which communicates with the beehive operator 820 and presents a GUI which may be used by the respective users to interact with the beehive operator 820.

In some exemplary embodiments, the apparatus 800 may comprise, and/or communicate with, via the network 802 for example, a backup and/or secondary storage such as 808, which may store information related to the beehive 801, such as frame data objects for each of the beehive frames 240 respectively, habitat data, and/or the like, optionally comprising information such as sensory data that may be gathered by the sensor(s) 803 and/or any other relevant frame and/or habitat information otherwise obtained, e.g., fetched from (optionally remote) resource(s) 806 and/or the like.

In some exemplary embodiments, the frame data objects and habitat data in the secondary storage 808 as referred to herein may be any suitable digital data structure and/or construct, and/or likewise computer data objects that may enable storing, retrieving, and/or modifying values. For example, the frame data objects and habitat data at secondary storage 808 may be and/or may comprise files, tables, lists, and/or the like in a database in secondary storage 808, and may include a number of fields that may be set and/or cleared, a plurality of parameters for which values may be set, a plurality of entries that may be modified, and so on. For example, a condition and/or state of cells and pests in a first honeycomb may be stored in a first frame data object, a condition or state of cells and pests in a second honeycomb may be stored in a second frame data object and so on. Optionally, identifiers such as readable tags and/or chips, e.g., infrared (IR) reflection-based and/or the like, such as 460 of FIG. 4 herein, may be embedded and/or included in respective beehive frame covers 200/300 of beehive frames 240 such that each may be identified and associated with a frame data object corresponding thereto, In some exemplary embodiments, information and/or content may be loaded from secondary storage 808 into storage 814 and/or to processor(s) 812 for processing, analysis, aggregation, usage, and/or the like by beehive operator 820, for example, information from a frame data object may be loaded into storage 814 and/or processor(s) 812 and used by beehive operator 820 for determining beekeeping operation(s) to be carried out on a respective beehive frame with which the frame data object is associated, e.g., selecting a treatment against pests and/or the like as described herein.

The apparatus 800, communicating with one or more of the external devices, client terminals 804, and/or resources 806, may therefore receive, fetch, collect and/or otherwise obtain data and information required for operating beehive 801 automatically and/or autonomously. Such data and information may include, for example: schedule for inspection of beehive frames, bees feeding instructions, beehive frames pest treatment instructions, and/or the like. Optionally the apparatus 800 may communicate with one or more of the external devices and/or client terminals 804 to output data and information to a user pertaining to beehive 801, such as for example, beekeeping operations log, bees and/or colonies health status reports, and/or the like.

The beehive operator 820 may be adapted to receive as input and/or otherwise obtain from default storage, such as for example resources 806 and/or the like, instructions for monitoring and/or treatment of beehive frames 240 in the beehive 801. The beehive operator 820 may be adapted to perform beekeeping operations on beehive 801 in accordance with received input and/or data otherwise obtained, using sensor(s) 803 and/or actuator(s) 805 for tracking, interacting with, and/or manipulating of any one of beehive frames 240 via utilization of beehive frame covers 200 and/or 300 such as disclosed herein. The beehive operator 820 may be adapted to output an indication of beehive frame monitoring and/or treatment, and/or of other likewise beekeeping operations performed and/or related information such as frame data, habitat data, and/or the like to a user, e.g., via client terminal 804 and/or the like.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant tools and/or techniques for control and management of an automated and/or autonomous beehive, in which beehive frame cover(s), such as disclosed herein, may be deployed and/or utilized, will be developed, and the scope of the terms "automated beehive" and/or "autonomous beehive" is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment may include a plurality of "optional" features unless such features conflict.

Throughout this application, various embodiments may be presented in a range format. It should be understood that the description in range format is merely for convenience and brevity and should not be construed as an inflexible limitation on the scope of embodiments. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of embodiments, which are, for clarity, described in the context of separate embodiments, may also be provided in combination in a single embodiment. Conversely, various features of embodiments, which are, for brevity, described in the context of a single embodiment, may also be provided separately or in any suitable subcombination or as suitable in any other described embodiment. Certain features described in the context of various embodiments are not to be considered essential features of those embodiments, unless the embodiment is inoperative without those elements.

Although embodiments have been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present disclosure. To the extent that section headings are used, they should not be construed as necessarily limiting. In addition, any priority document(s) of this application is/are hereby incorporated herein by reference in its/their entirety.

What is claimed is:

1. A beehive frame cover, comprising:

an elongated body portion extending at least to a length of a top bar of a beehive frame and adapted in size and shape to cover at least a portion of the top bar when placed juxtaposed over and parallelly to the top bar; and two arms disposed at opposite ends of the elongated body portion at a distance adapted to accommodate the top bar, the two arms extruding downwardly from the elongated body portion and adapted to engage and grip the top bar at each of respective opposite ends thereof when placed juxtaposed against and laterally to each of the respective opposite ends of the top bar, wherein the elongated body portion comprises a concave shaped portion extending along at least part of an axial edge thereof, and a corresponding convex shaped portion extending along at least part of an opposite axial edge thereof, whereby consecutive units of the beehive frame cover are adapted to engage one another at respective concave and convex shaped portion to form a contiguous cover.

2. The beehive frame cover of claim 1, wherein the convex shaped portion comprises at least one elastic flange.

3. The beehive frame cover of claim 2, wherein the convex shaped portion comprises a pair of elastic flanges inclined towards one another.

4. The beehive frame cover of claim 1, wherein an arm of the two arms and the elongated body portion are attached by a hinge disposed transversely at an end of the elongated body portion, whereby the arm is at least partially rotatable around a transverse axis of the top bar to alternate between an open and closed position, wherein in the closed position the arm is engaged with and firmly gripping the top bar for securely retaining the beehive frame, and wherein in the open position the arm is hanging loosely and freely on the hinge and not engaging the top bar.

5. The beehive frame cover of claim 4, wherein the arm comprising a latch adapted to engage with a groove provided at the end of the elongated body portion for securely fastening the arm to the top bar when the arm is in the closed position, wherein the latch is adapted to allow releasing grip of the arm on the top bar in response to pressing the latch towards the elongated body portion and outwards of the groove.

6. The beehive frame cover of claim 1, wherein an arm of the two arms comprises two outer surface portions disposed laterally at each of opposite sides of a transverse axis of the top bar and adapted to be engaged and gripped by jaws of downward facing clamps, whereby allowing for retaining the beehive frame and spatially translating thereof via motion of the downward facing clamps.

7. The beehive frame cover of claim 1, wherein an arm of the two arms comprising, on an exterior region thereof facing outwardly of the top bar, a protruding portion having at each of opposing sides of the arm a slanted surface boundary facing laterally from the beehive frame and adapted to engage with a slanted surface boundary at a back of each one of a pair of jaws of downward facing clamps, thereby allowing the downward facing clamps to exert mechanical force on the arm at the protruding portion for displacing the beehive frame sideways.

8. The beehive frame cover of claim 1, wherein an arm of the two arms extends to a length of at least a portion of a height of the beehive frame and adapted to engage with at least a portion of a respective side bar of the beehive frame proximally to the top bar.

9. The beehive frame cover of claim 1, wherein an arm of the two arms comprises, in an interior region thereof facing the top bar, a recessed portion adapted to accommodate a respective ear of the top bar protruding over a respective side bar of the beehive frame.

10. The beehive frame cover of claim 1, wherein an arm of the two arms comprises a groove adapted to engage a rail provided within a beehive housing, whereby a beehive frame attached to the beehive frame cover is allowed to slide along the rail transversely.

11. The beehive frame cover of claim 1, wherein an arm of the two arms comprises at respective opposing sides laterally to the top bar a cavity on one of the respective opposing sides and a protrusion adapted to be fitted into the cavity at least partially on another one of the respective opposing sides, whereby consecutive units of the beehive frame cover stacked side-by-side against one another are kept aligned at a minimum distance therebetween.

12. The beehive frame cover of claim 1, wherein the elongated body portion and two arms are integrally formed into a single monolithic unit, wherein the two arms are rigidly disposed perpendicularly to the elongated body portion.

13. The beehive frame cover of claim 1, wherein the elongated body portion comprises at least one bore adapted to allow access to the top bar for probing the beehive frame.

14. The beehive frame cover of claim 1, further comprising an alignment pattern adapted to enable recovery of alignment information when the alignment pattern is at least partially visible.

15. The beehive frame cover of claim 1, further comprising a radio frequency identification tag.

* * * * *